United States Patent

Promis et al.

[11] 4,287,461
[45] Sep. 1, 1981

[54] MOTOR DRIVING SYSTEM

[75] Inventors: George G. Promis, Arvada; Gerald L. Smith, Broomfield; John C. Wilson, Longmont, all of Colo.

[73] Assignee: International Business Machines Corporation, Armonk, N.Y.

[21] Appl. No.: 100,773

[22] Filed: Dec. 6, 1979

[51] Int. Cl.$^3$ ............................................. G05B 24/19
[52] U.S. Cl. .................................. 318/571; 318/603; 355/14 C
[58] Field of Search ............... 318/603, 600, 561, 571, 318/602; 355/14 C, 3, 8

[56] References Cited

U.S. PATENT DOCUMENTS

| | | | |
|---|---|---|---|
| 3,612,840 | 10/1971 | Stobbe | 318/600 X |
| 3,689,143 | 9/1972 | Case | 355/3 |
| 3,742,326 | 6/1973 | Okuda | 318/603 |
| 3,795,851 | 3/1974 | Gage | 318/602 |
| 3,798,524 | 3/1974 | Okamoto | 318/571 |
| 3,820,893 | 6/1974 | Donohue et al. | 355/14 |
| 3,917,396 | 11/1975 | Donohue et al. | 355/14 |
| 3,917,400 | 11/1975 | Rodek | 355/50 |
| 3,939,390 | 2/1976 | Pomella et al. | 318/604 |
| 4,066,941 | 1/1978 | Foster | 318/685 X |
| 4,084,897 | 4/1978 | Queener | 355/8 |
| 4,109,185 | 8/1978 | Froyd et al. | 318/571 |
| 4,129,813 | 12/1978 | Hunts et al. | 318/561 |
| 4,143,310 | 3/1979 | Fujinawa | 318/571 |
| 4,145,643 | 3/1979 | Maeda | 318/696 |
| 4,215,300 | 7/1980 | Schmidt | 318/603 |

Primary Examiner—B. Dobeck
Attorney, Agent, or Firm—Pollock, Vande Sande & Priddy

[57] ABSTRACT

A motor driving system which is particularly useful for driving scanning carriages in a continuously variable reducing electrophotographic copier. The motor driving system produces one of a number of different controlled and repeatable position acceleration and velocity profiles of the scanning carriage with respect to motion of the copier drum; a different position acceleration and velocity profile is produced for each reduction mode in a substantially continuous range of reduction modes. The motor driving arrangement includes a single control loop for driving a servo motor which provides the drive for the scanning carriage. A driving signal source produces a driving signal pulse train, each pulse representing a desired increment of motor travel, and a direction signal representative of the desired direction of travel. A tachometer is responsive to servo motor motion and produces an output signal representative of the direction of motion; the output signal includes a series of tachometer pulses, each pulse representing a given increment of servo motor movement. A logic circuit couples the output of the tachometer, the driving signal pulse train and the direction signal to an up/down counter which is stepped in one direction for each driving signal pulse, and which is also stepped in another or one direction, respectively, for each tachometer pulse which represents a direction which is the same as or different from the direction of the direction signal. The output of the up/down counter, converted to analog form, provides an input signal to drive the servo motor. In order to control the acceleration, velocity and position profiles of the scanning carriage, the driving signal source produces a train of output pulses whose repetition rate is precisely controlled in relation to the motion of the drum. The driving signal source includes a counter which produces a pulse output each time a predetermined count is reached, the counter is stepped at a rate related to the velocity of the drum, and the repetition rate of the output pulses is controlled by providing a sequence of quantities, from a storage matrix, to alter the modulus of the counter in a predetermined pattern.

48 Claims, 47 Drawing Figures

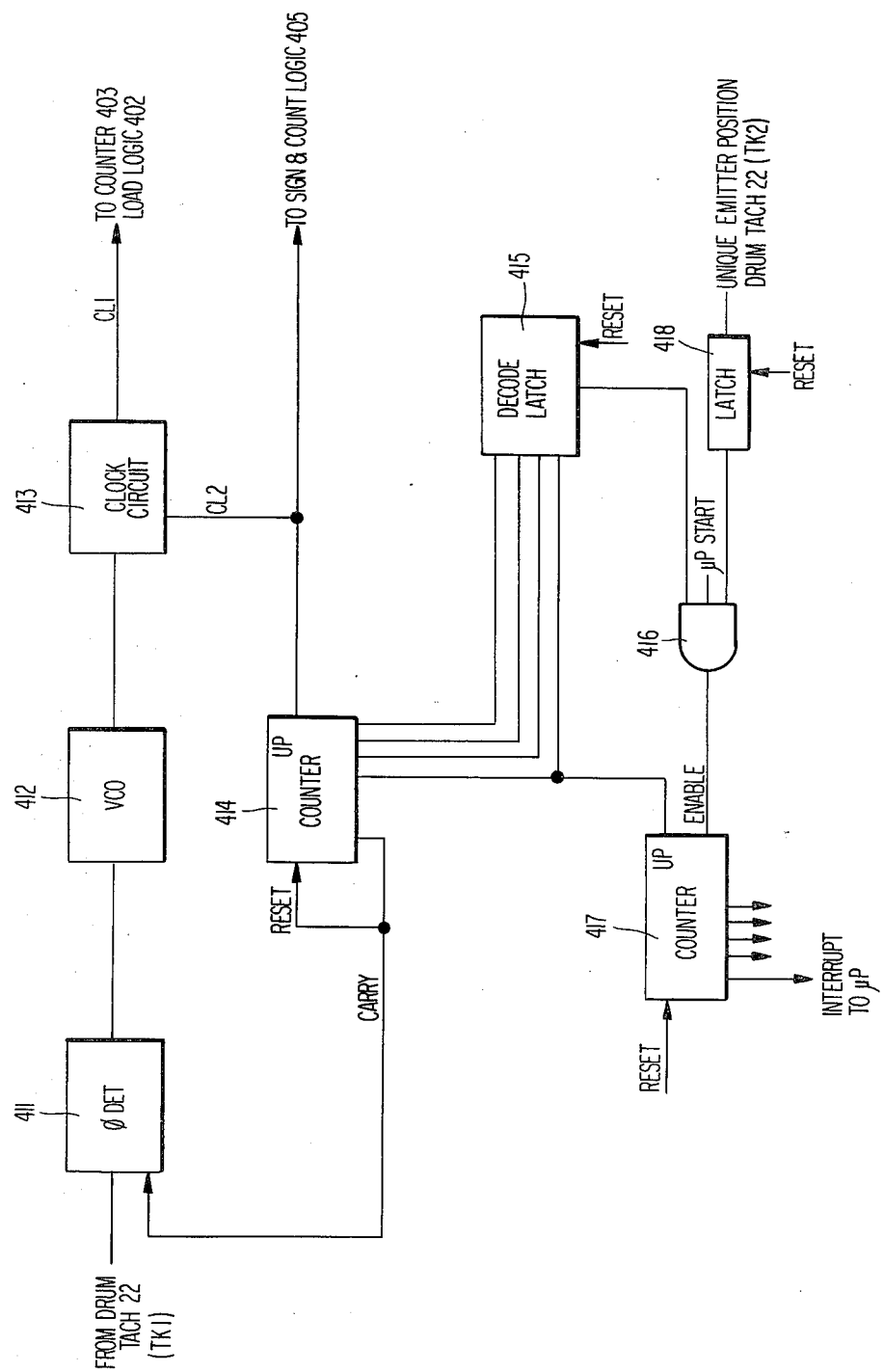

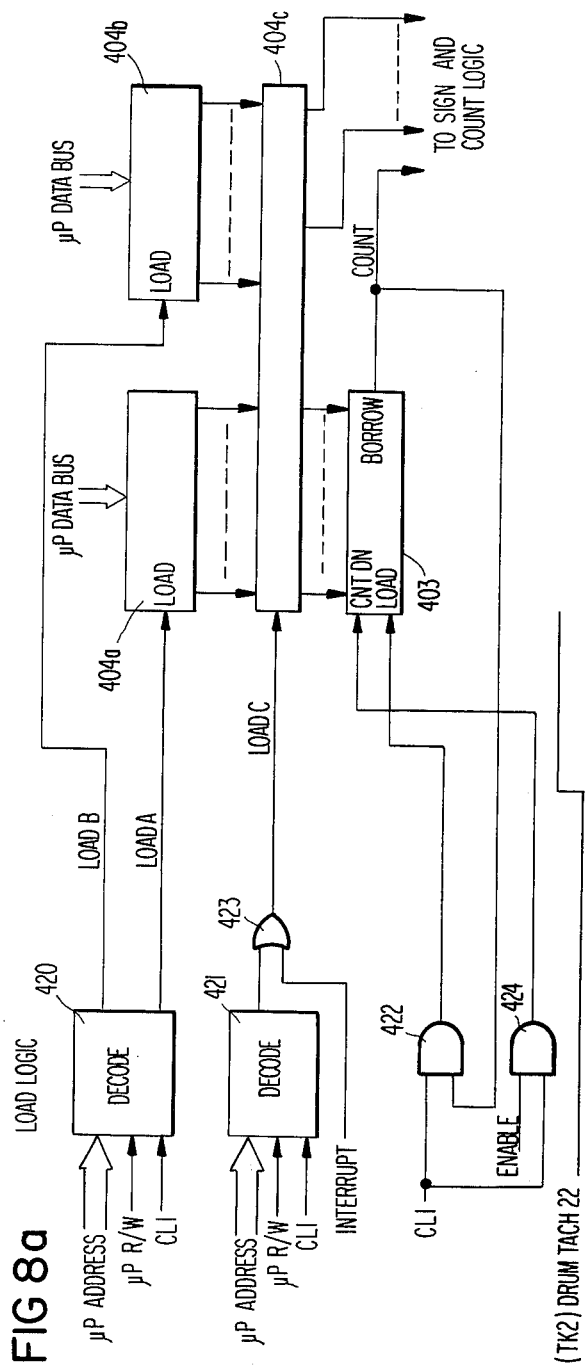
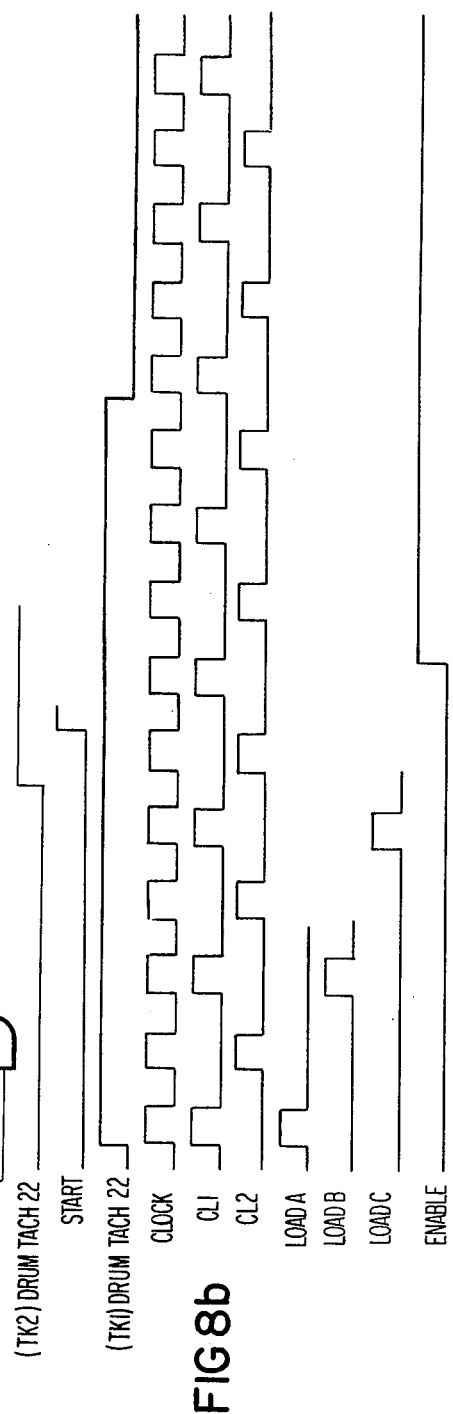
FIG 8a
FIG 8b

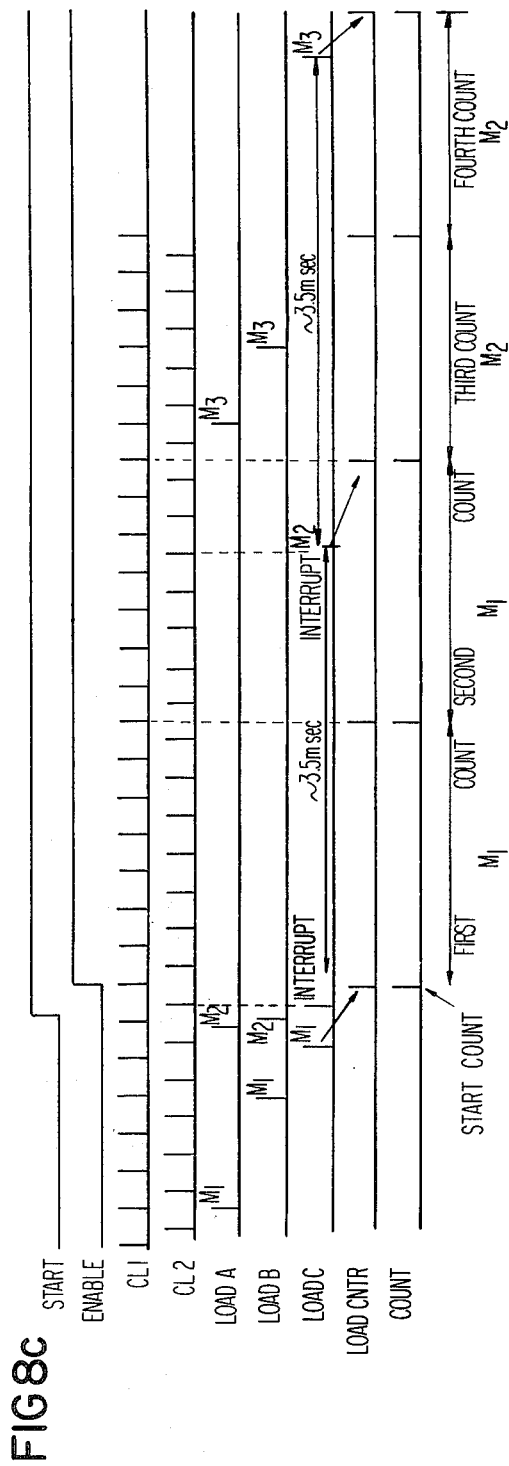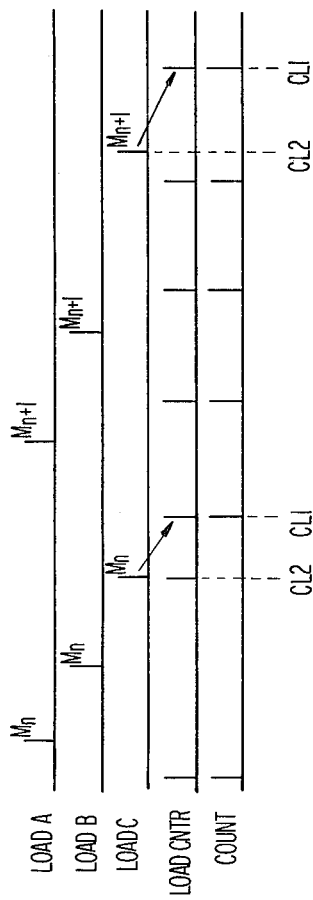

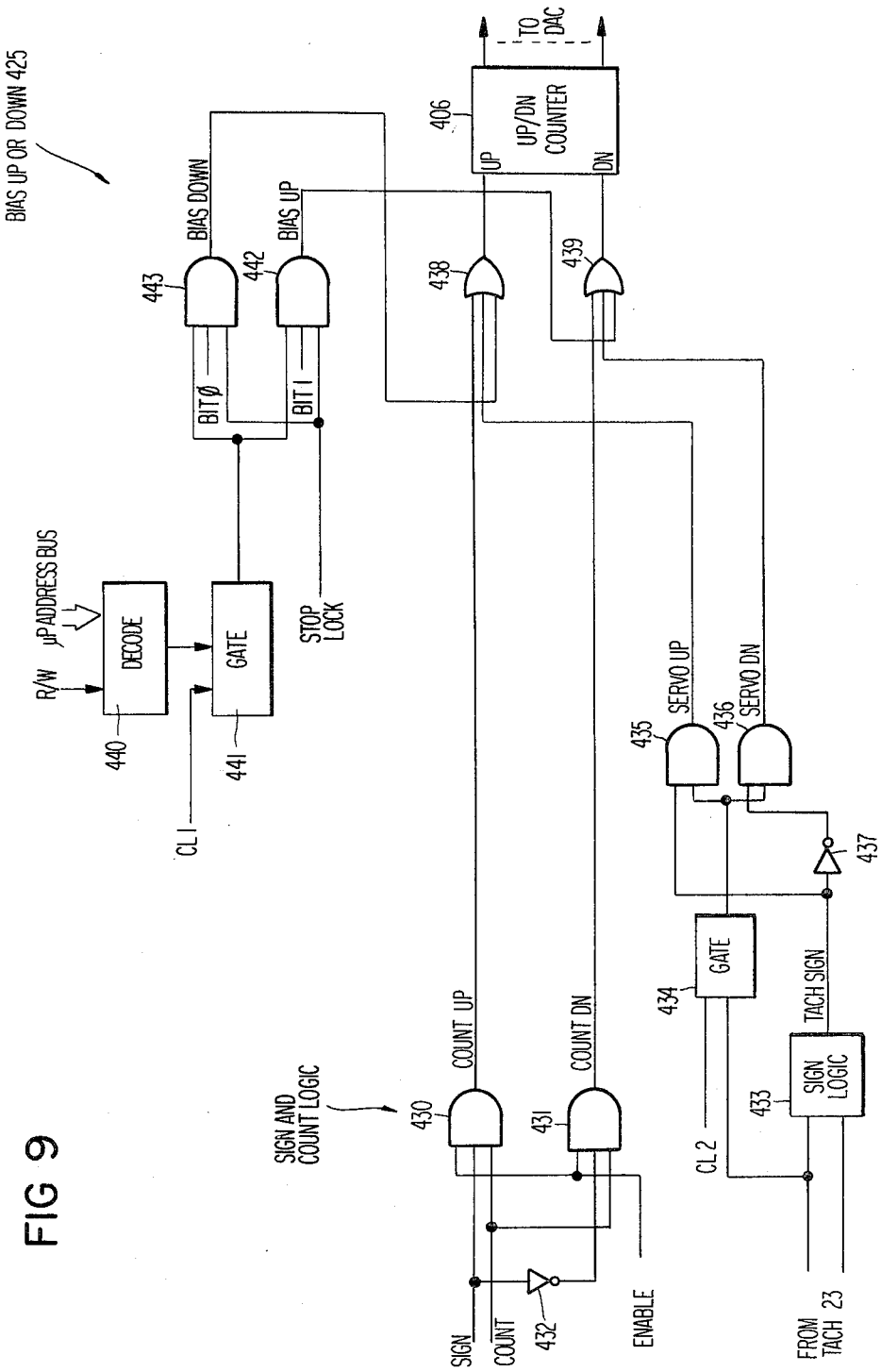

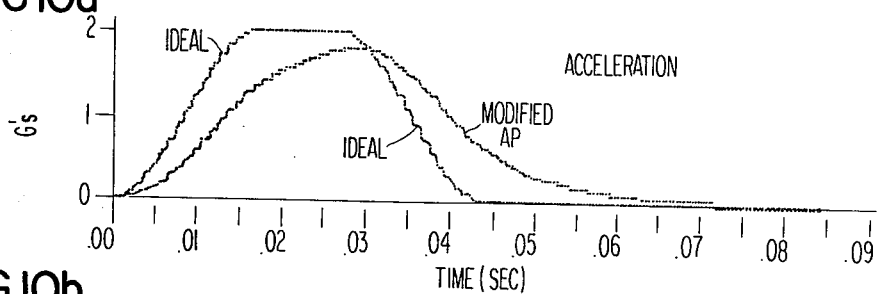
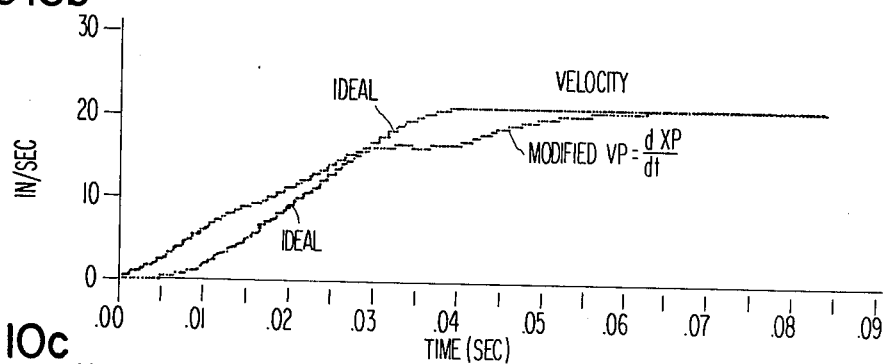
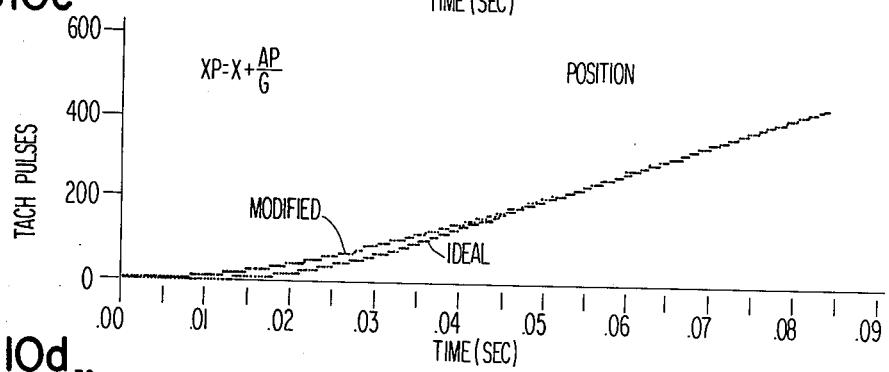
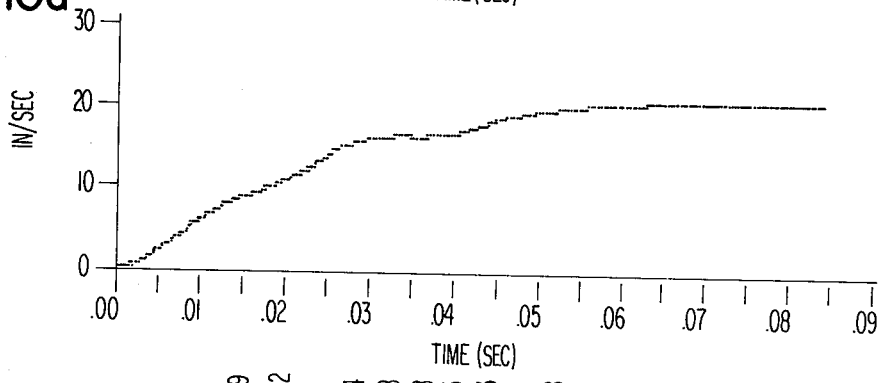

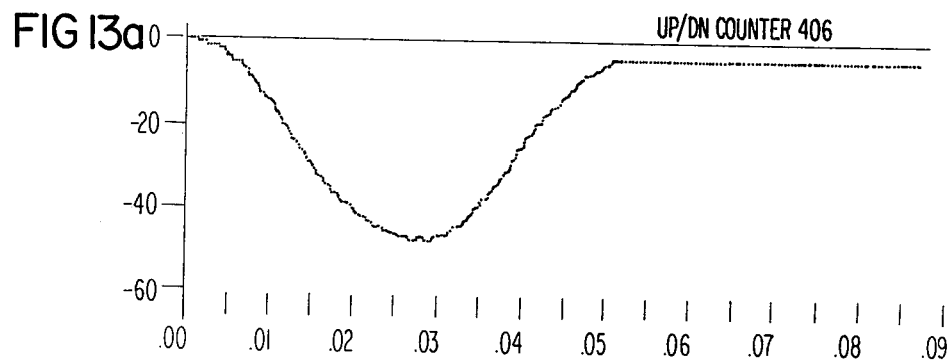
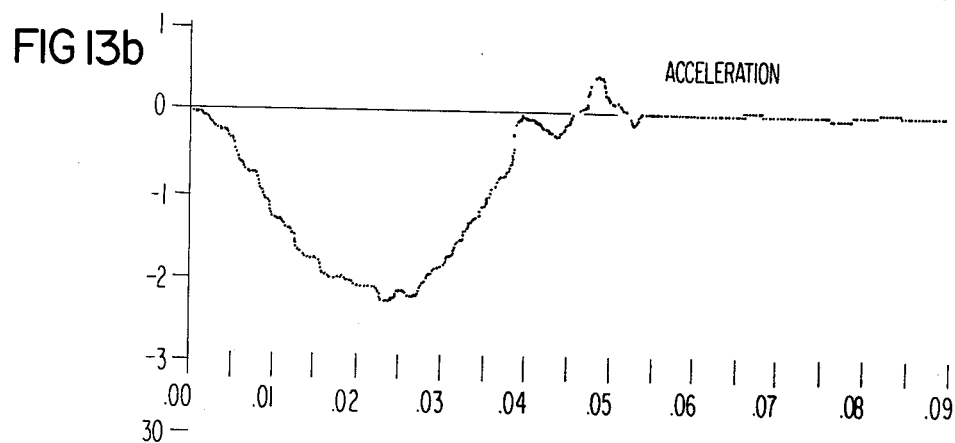
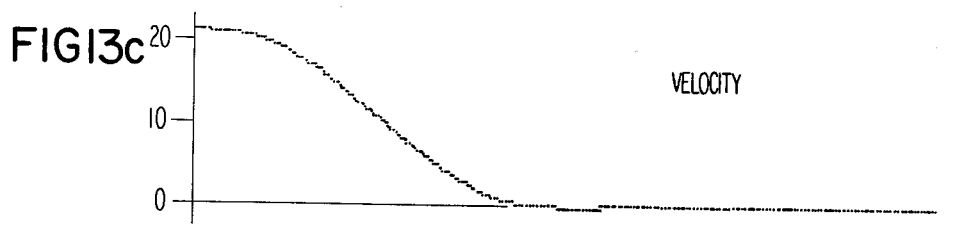
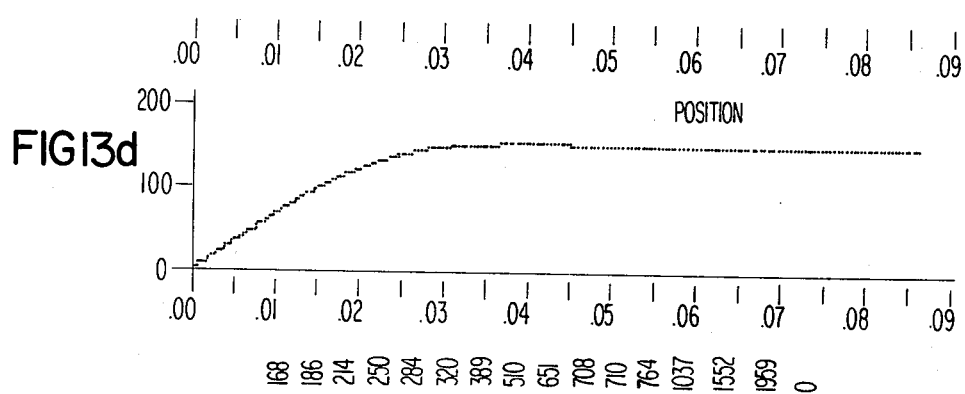

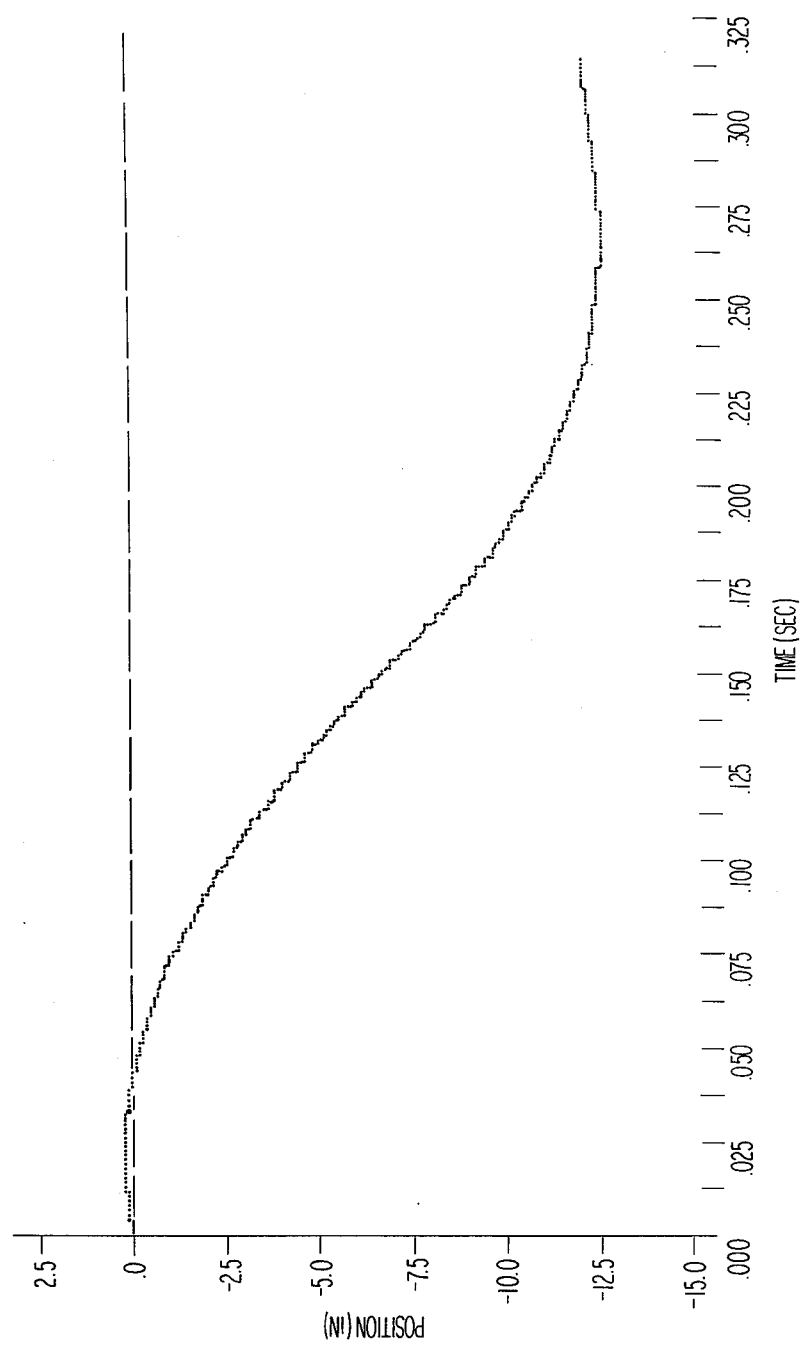

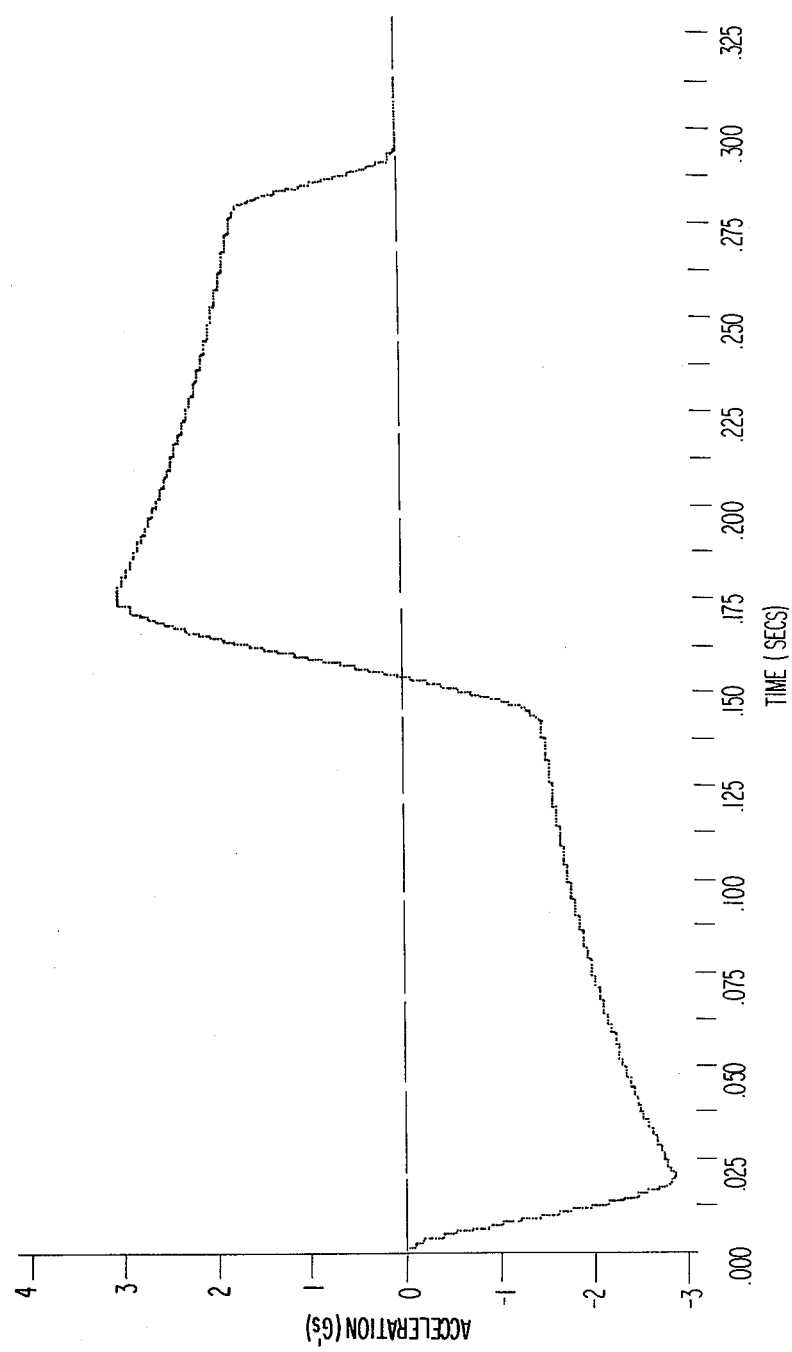

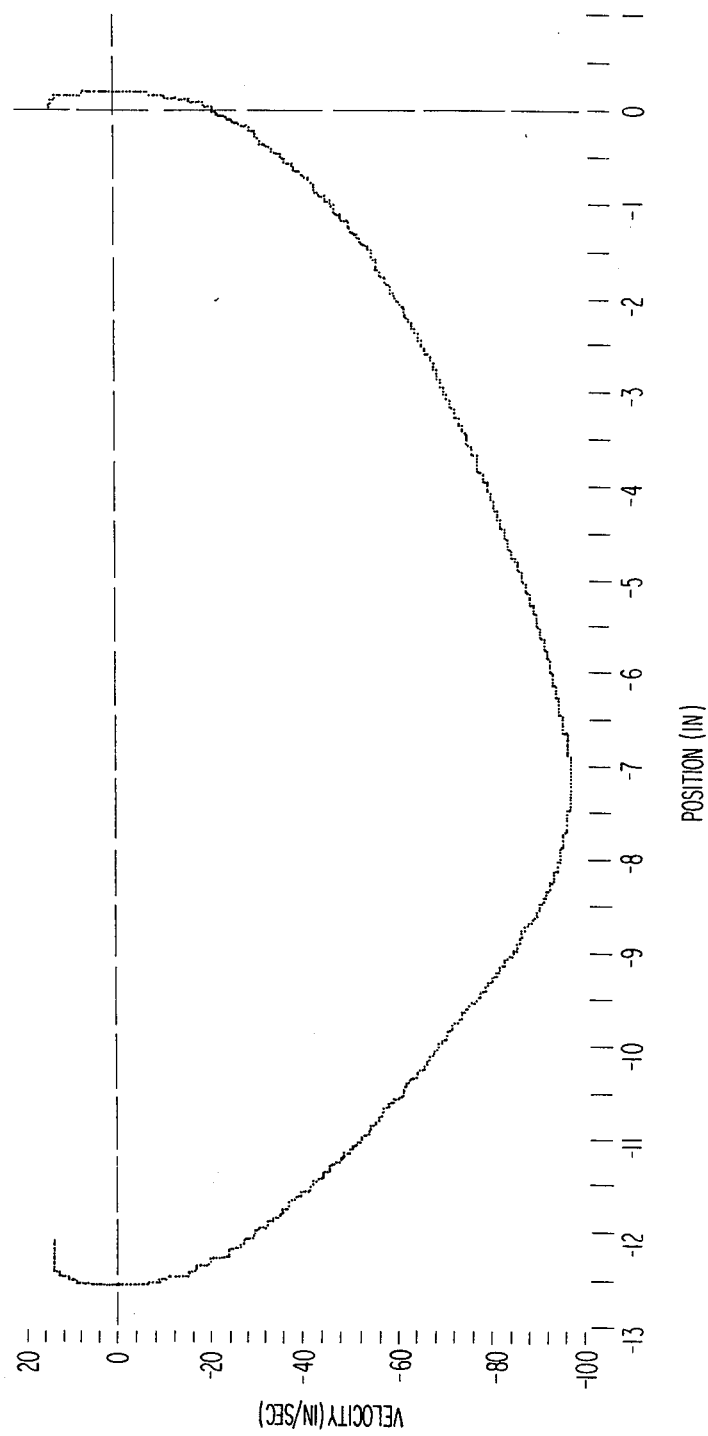

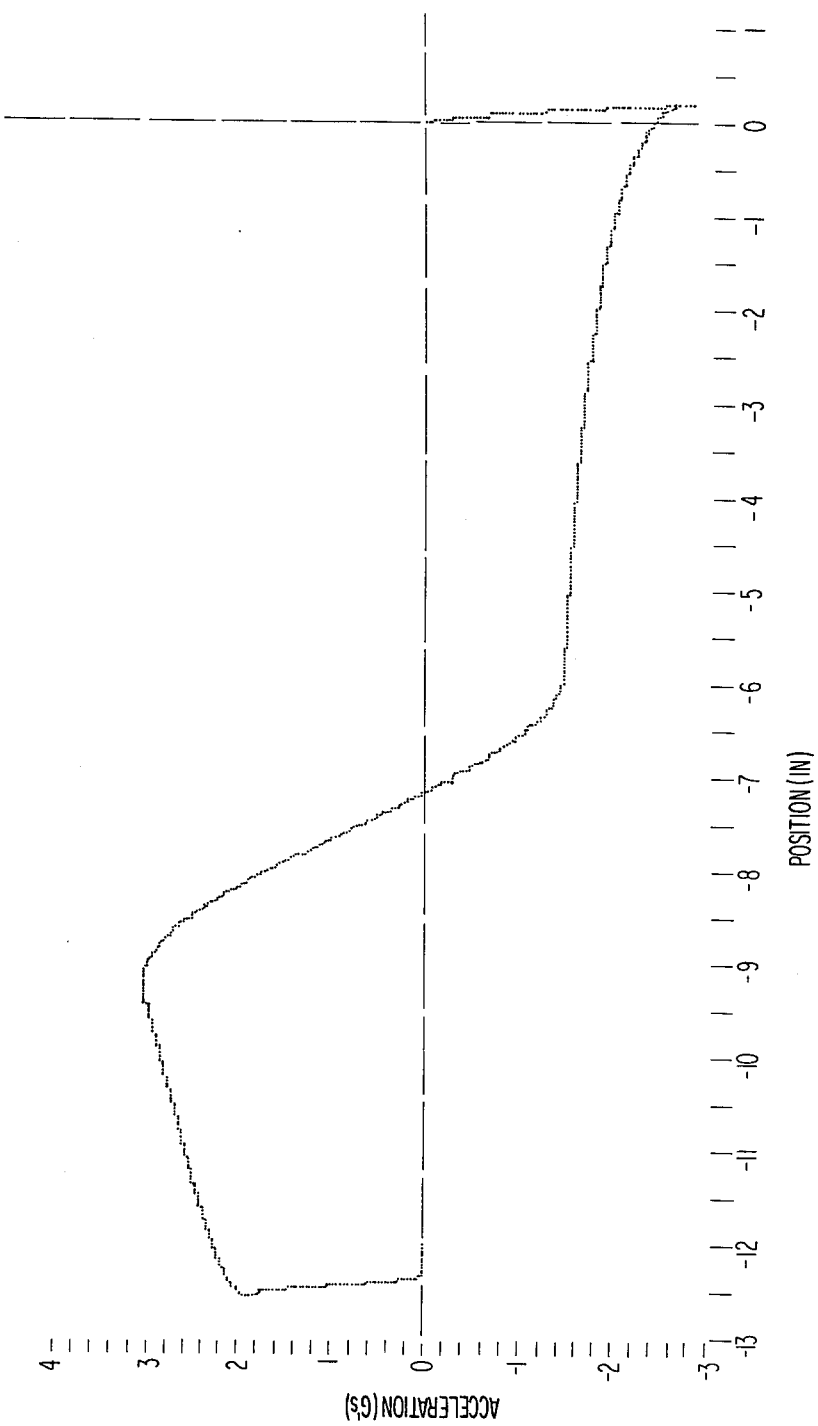

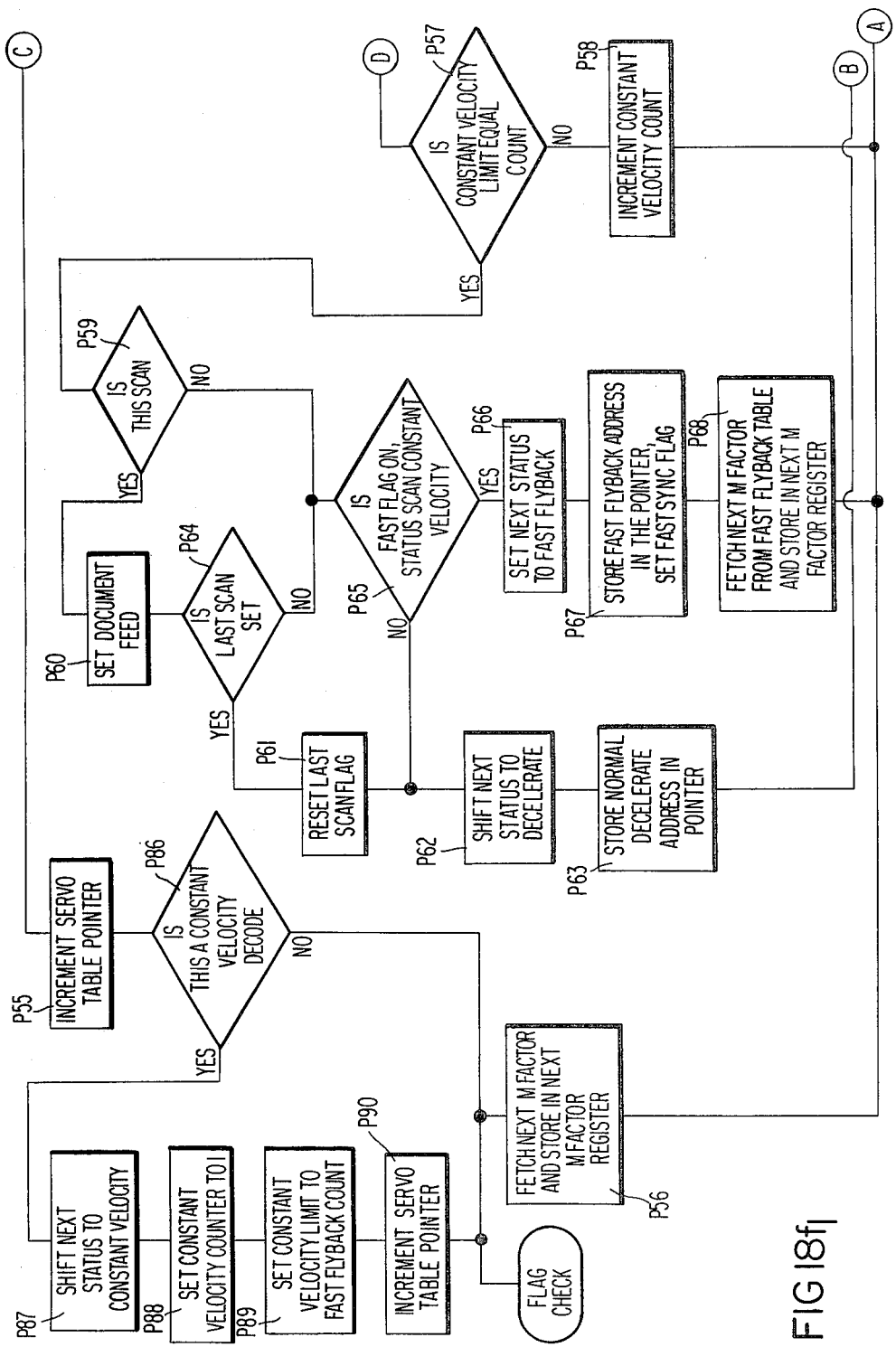
FIG 18f1

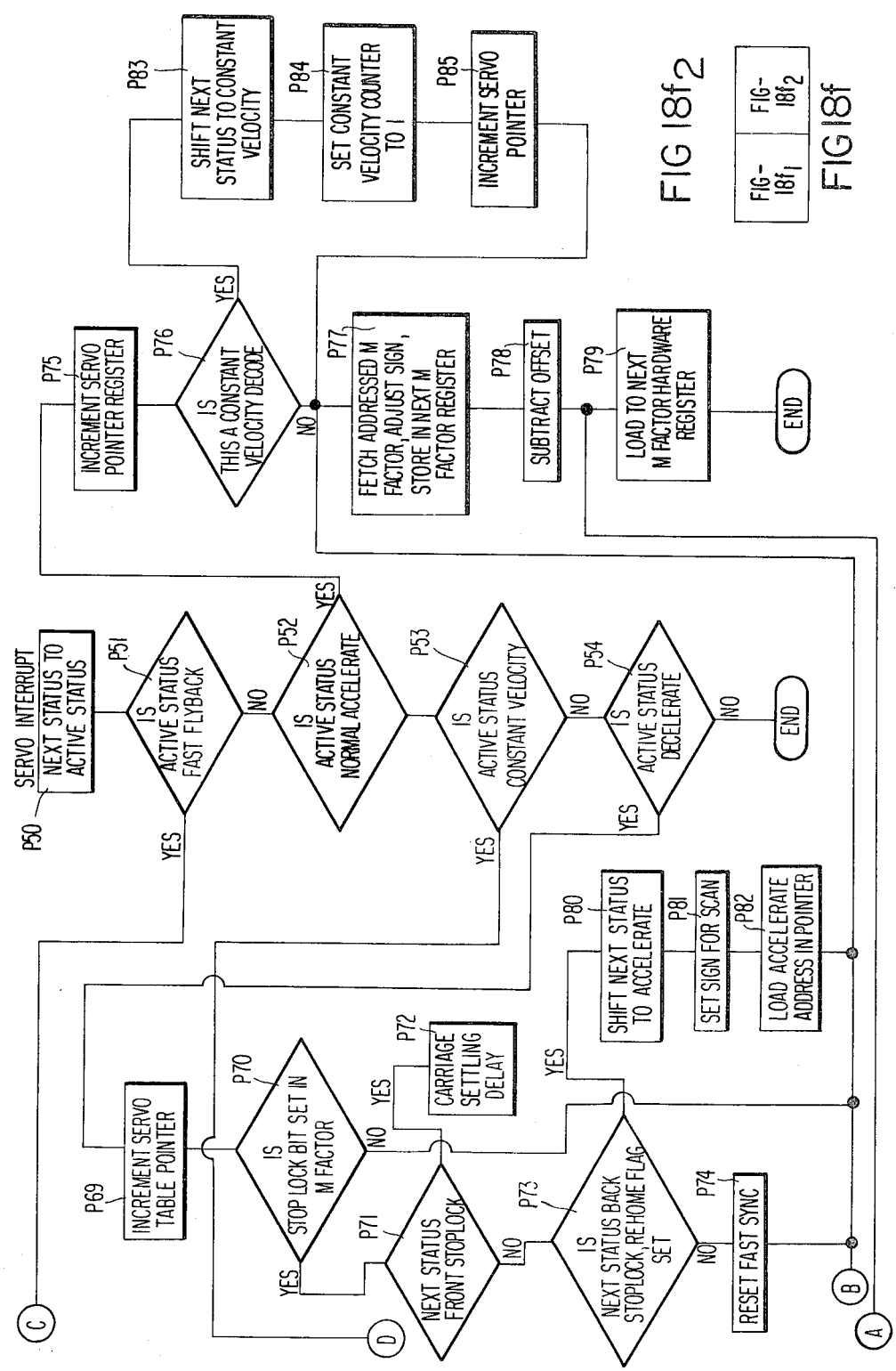

MOTOR DRIVING SYSTEM

FIELD OF THE INVENTION

The present invention relates to a driving system for producing controlled and repetitive position, acceleration and velocity profiles of a controlled object. The invention finds particular utility in a copying machine capable of plural reduction modes, for driving a scanning carriage in a controlled and repetitive fashion, controlled with respect to motion of a photoconductor carrying drum.

RELATED APPLICATIONS

The present invention provides an electrical drive for a scanning carriage in a copier which, in other respects, is disclosed in application Ser. No. 904,706, filed on May 10, 1978, which is a continuation of now-abandoned Ser. No. 721,125, filed on Sept. 7, 1976, commonly assigned, and in "Electrical Drive for Scanning Optics in a Continuously Variable Reduction Copier" Ser. No. 100,775 filed on even date herewith and also commonly assigned. The disclosures of each of these applications is incorporated by reference herein.

BACKGROUND OF THE INVENTION

The prior art evidences a variety of arrangements for the purpose of controlling the motion of an object, either its position as a function of an independent parameter, its velocity as a function of an independent parameter, or both. A simple arrangement to effect position control is illustrated in Davis, U.S. Pat. No. 3,099,777. In Davis, a bi-directional counter is initially loaded with a count identifying the controlled object's present position, and a second counter is loaded with a count corresponding to the desired position of the controlled object. The second counter is down counted to zero, while simultaneously down counting the first counter. When the second counter has been counted to zero, the quantity remaining in the first counter is the offset or difference between the present and desired positions of the object. At that time, a gate coupled between a digital to analog converter, responsive to the output of the first counter and a motor is enabled to couple the output of the digital to analog converter to the motor to thereby drive the motor toward the desired position. A feedback circuit is used to modify the count in the first counter in accordance with actual movement of the object, such that the object is brought to rest at the desired position. Thus, the Davis arrangement provides for movement of the object from a present to a desired position, although it makes no provision for the control of that movement with respect to an independent parameter; in other words, the acceleration or velocity imparted to the controlled object is controlled solely by the extent through which the object is to be moved, and there is no control over the time duration of the movement itself and no control over the shaping of the acceleration, velocity and position profiles.

Gardener, in U.S. Pat. No. 3,859,581, discloses a technique for controlling jerk or rate of change of acceleration in which the rate at which a motor control signal can change is controlled. The motor control signal is provided by the digital to analog converted output of a bi-directional counter, which is counted up or down at a rate determined by a clock in accordance with the relationship between actual and desired velocities of a controlled object. Gardener teaches that the clock frequency can be controlled so as to put a limit on maximum acceleration.

Reuteler, in U.S. Pat. Nos. 3,414,787 and 3,443,178 discloses a servo system for controlling position and velocity of a controlled object. The servo system includes for each axis of movement of the controlled object, both a velocity and a position loop so that the gain of the position loop can be adjusted without affecting the velocity loop. The input commands to the servo system include a displacement quantity, one for each independent axis of movement, and a common feed rate quantity intended to determine the rate of movement with respect to all axes. The feed rate number is added to itself a number of times at a selected rate, and when the sum exceeds a predetermined quantity, an overflow pulse is produced. An overflow pulse train is provided to a command pulse generator which is a counter which counts overflow pulses, and various stages of the counter are used to generate a variety of pulse frequencies. The largest pulse frequency is employed to generate command pulses, proportional in number to the desired displacement, and produced at a rate related to the feed rate number. Thus, in contrast to Davis and Gardener, the Reuteler system controls both velocity and position, although employing a different loop for each parameter.

Foster, in U.S. Pat. No. 4,066,941 discloses an arrangement useful in speed control. In several embodiments of the invention, the controlled motor is a stepping motor and speed control is effected by varying the inter-pulse periods of the several stepping pulses used to drive the motor. The inter-pulse periods are varied by deriving those pulses from a counter which is clocked at a constant rate, but which may be preset after reaching a predetermined count, to a value which is either the complement of, or directly related to the desired inter-pulse period. In another embodiment of the invention in which a continuously rotating motor is controlled, a read-only memory stores the quantities which are either directly related to, or complements of the desired inter-pulse period and which are successively coupled to a comparator at the completion of each incremental movement of the motor shaft. A constant frequency oscillator clocks a counter which is also reset on the completion of a given increment of movement of the motor shaft. The comparator compares the quantities presented to it by the read-only memory and the timing counter, and can, from those quantities, determine whether the motor is travelling at the proper speed, above the proper speed, or below the proper speed. The output of the comparator is employed to control the driving current of the motor in a fashion so as to reduce the "error" in motor speed. While Foster appears to provide an effective arrangement to control speed, this apparatus makes no provision for controlling the position profile of the motor.

Maeda, in U.S. Pat. No. 4,145,643, discloses an arrangement for driving a pulse motor in which a command, having a quantity related to the desired movement of the motor, is decremented as the motor is rotated, and in which the frequency at which the quantity is decremented, and hence, the velocity of the motor is determined by the ratio of the distance the motor is to be moved to the time over which the movement is to occur. Hence, an arrangement is disclosed for controlling the velocity of a motor.

As indicated by the Reuteler patent, merely controlling the velocity of movement is, in many applications, inadequate. One such application in which merely controlling the velocity of an object is inadequate is that of driving the scanning carriage in a continuously variable reducing copying machine, such as that disclosed in application Ser. No. 100,775 filed concurrently with this application, and assigned to the assignee of this application.

As is disclosed in that application, correct operation of the continuously variable reducing copying machine requires that a scanning carriage be driven in a cyclical movement from a home position, first to a rescan position, the length of the rescan depending, at least in part, upon the selected reduction ratio, and that the scanning carriage then be scanned back toward the home position in such a manner that it reach a velocity having a ratio with the velocity of the copier drum equal to the selected reduction ratio, and maintain that relationship throughout a given scanning movement, and then be decelerated to stop at the home position. However, merely controlling the velocity of the carriage is inadequate since not only must the velocity of the carriage reach the desired velocity relationship, but that relationship must be reached at a given position in the movement, and at the correct time. Thus, devices for merely controlling the velocity of an object simply fail to satisfy the requirements of driving the scanning carriage in a continuously variable reducing electrophotographic copier.

The referred-to application discloses two preferred embodiments, a first preferred embodiment which employs three (3) partially overlapping feedback loops in order to control the motor driving the scanning carriage assembly. A first feedback loop derives a pulse train at a repetition rate related to the velocity of the copier drum, which is used to cycle a counter, which counter is preset so that it produces an output pulse when the counter reaches a predetermined quantity, which output pulse forms a pulse in a pulse train having a repetition rate bearing a selected ratio with the pulses cycling the counter, which ratio is selected in accordance with the desired velocity ratio between the scanning carriage assembly and the copier drum. The pulse train from the counter is applied to a phase comparator which receives on another input pulses provided by a tachometer driven by the motor driving the scanning carriage assembly. The output of the phase comparator thus provides a representation of the velocity error, which is used in a velocity feedback loop to maintain a velocity error near zero. In order to insure that the scanning carriage assembly reaches the proper velocity at the proper point in time, relative to the copier drum, a second feedback loop is employed to control acceleration and deceleration of the scanning carriage assembly. In this second feedback loop, a processor stores a table of desired scanning carriage assembly positions, as a function of time during the acceleration or deceleration phases of movement. At periodic intervals, determined in relation to the rotational rate of the copier drum, a counter which counts pulses from the tachometer is compared to a count representing the desired position of the scanning carriage assembly. Any difference or error is employed to modify an accelerating drive signal, which is used to drive the motor during its acceleration phase. Thus, the second feedback loop insures that the scanning carriage assembly reaches the desired velocity at the proper point in time, i.e., its position profile is controlled. The count attained in the counter employed in the acceleration feedback loop is maintained during the constant velocity phase, and another counter, keeping track of scanning carriage assembly position, continuously compares the two quantities. When the counts compare, the constant velocity phase of motion is terminated, and a deceleration phase is entered. When deceleration is complete, in a rescan for example, the several counters are reset and the scanning movement is initiated, having similar acceleration, constant velocity and deceleration phases of movement.

While the first preferred embodiment briefly described above provides for sufficient control of the scanning carriage assembly for use in a continuously variable reducing copying machine, the present application discloses an improved driving arrangement for such a scanning carriage assembly which exhibits significant advantages over the first preferred embodiment of the referenced application.

The control philosophy of the first preferred embodiment of the referenced application is based upon the desired goal of employing equal acceleration of the scanning carriage assembly regardless of the reduction ratio. The use of a fixed acceleration, although resulting in some simplifications in the control circuit, can be disadvantageous in some respects, especially in the initial stages of the movement, for it results in a relatively large and rapid change of acceleration, requiring sufficient power handling capacity of a motor. We have found that by tailoring the acceleration profile of the motor, components having a reduced power handling capacity are adequate. In addition, by tailoring the acceleration profile of the motor, physical resonances in the mechanical components can be reduced, thus significantly increasing the accuracy with which the movement is carried out.

In addition, typical commercial copiers employ a copy sequence in which the drum rotates twice for each copy produced; actual copying takes place on a first drum cycle, and the second drum cycle is devoted to cleaning the drum. By use of an overcharge/backcharge technique described in Ser. No. 93,551 filed Nov. 3, 1979, two cycle machines can be changed into a one cycle machine, i.e., a machine capable of producing a copy on each rotation of the drum as long as the document to be copied is not changed. There is a need to reimage the document on each cycle and the image on the drum must coincide precisely with the preceding image to avoid smearing the image. By increasing the accuracy with which the movement of the scanning carriage assembly is effected, we have found that we can control the registration of the image on the copying drum in different cycles within a tolerance conservatively set at ±0.1 mm. Obviously, a copier which does not waste drum revolutions in cleaning the drum is desirable. However, the first preferred embodiment of the referenced application did not have a position tolerance small enough to enable the production of quality copy in this environment. In the brief description of the first preferred embodiment, mention was made of a counter which was initially loaded with a count representing the desired length of movement of the scanning carriage assembly for the selected reduction ratio, which counter was counted down during the course of either a rescan or a scan movement. In order to effect this operation, the counter had to be reset at the conclusion of a rescan operation and prior to the beginning of a scan movement. This resetting of the counter meant that any accumulated error in the position of the carriage at the termination of the rescan movement was lost, and that error would be reflected in an error in the scanning carriage assembly position profile. While this "error" could be eliminated by increasing the gain of the loop, this is not a practical alternative since it would increase the susceptibility of the system to physical resonance. Also, the processor employed to make the repeated comparisons of scanning carriage assembly position in the course of the accelerating movement is a poorly timed device which also introduced variations in scanning carriage position from one rescan-scan cycle to the next which limited achievable position repeatability. Similar errors may well have been introduced during the switching from one feedback loop to another during the transition from acceleration to constant velocity motion, and constant velocity motion to deceleration.

It is therefore one object of the present invention to provide a position control system which has the capability of simultaneously controlling position profile, acceleration profile and velocity profile with a single control loop. It is another object of the present invention to provide a driving control system which eliminates the necessity for relying upon a processor in the control loop. It is another object of the present invention to provide a driving control arrangement for simultaneously controlling position and velocity profiles of a controlled object in which the control object exhibits cyclical motion, and in which the driving control arrangement eliminates the necessity for resetting a counter representing controlled object position. It is another object of the present invention to provide such a driving control arrangement in which the acceleration, velocity and position profiles of the controlled object can be controlled with respect to an independent parameter, i.e., for example, the velocity of a copying drum. A further object of the present invention is to provide such a driving control arrangement in which the acceleration, velocity and position profiles of the controlled object is repeatable from cycle to cycle with a relatively small position tolerance, i.e., on the other of ±0.1 mm. or less. It is still another object of the present invention to provide a driving control arrangement which does not rely upon the use of constant acceleration or constant deceleration movement but which is capable of tailoring acceleration and deceleration to decrease the power handling requirements of various components of the system.

It is another object of the present invention to eliminate (or reduce the accuracy requirement of) critical adjustments. Another object of the present invention is to provide a simple closed loop and accurate means of determining the home position (following power on or as part of an error recovery procedure). Note that the first preferred embodiment of the referenced application uses an open loop means of determining the home position.

Another important object of the invention is to provide in a scanning copier of commercially acceptable print quality the ability to copy on each cycle of a drum by immediately at the conclusion of an image transfer, deceleration the carriage, reversing its motion and accelerating it again to bring it up to scanning velocity during the time in which the drum rotates from end of image area to the beginning of the image area. Another object of the invention is to perform the foregoing fast flyback operation and reimage the drum image area with position error less than 0.2 mm.

BRIEF SUMMARY OF THE INVENTION

These and other objects of the invention are met by providing a translation system to produce a controlled and repeatable acceleration, velocity and position profile of a controlled object with respect to an independent parameter including a single control loop with driving means including a servo motor coupled to and driving said controlled object, tachometer means responsive to driving means movement for producing an output signal representative of direction of driving means movement and including a series of tachometer pulses, each pulse representing a given increment of driving means movement, logic means coupling said output signal, said driving signal pulse train and said direction signal to said up/down counter for stepping said up/down counter in one direction for each driving signal pulse and for stepping said up/down counter in another or one direction, for each tachometer pulse which represents a direction which is the same or different from the direction of said direction signal, respectively, said driving signal source including, counter means including a counter for producing a driving signal pulse each time a predetermined count is attained in said counter, modulus means coupled to said counter for altering the modulus of said counter, said modulus means including storage means for storing representations of a plurality of quantities and means for presenting a predetermined sequence of quantities to said counter means, and means for stepping said counter in accordance with said independent parameter.

In accordance with another aspect of the invention, a scanning electrostatic copying machine is provided for copying at substantially any reduction ratio within a range of reduction ratios with repeatable position and velocity profiles for a scanning carriage assembly, said machine comprising, a motor, image carrier means driven by said motor for recording a latent optical image thereon, a transparent document support, a lens, reduction means for positioning said lens at a position corresponding to a selected reduction ratio within said range, scanning carriage means for directing an image beam from said document support to said image carrier, servo motor means including a servo motor responsive to said reduction means for driving said scanning carriage means for movement uniquely selected in accordance with said selected reduction ratio, said servo motor means including a single control loop for controlling said servo motor to provide for repeatable acceleration position and velocity profiles of said scanning carriage means, said servo motor means including an up/down counter for driving said servo motor with a level representative of the contents of said counter, counter means for stepping said up/down counter, said counter means producing a pulse train at variable repetition rates, synchronized to said motor for driving said up/down counter; and storage means for storing quantities representative of variuous repetition rates at which said pulse train is produced.

BRIEF DESCRIPTION OF THE DRAWINGS

The present invention will be explained in connection with the attached drawings in which like reference characters identify identical apparatus, and in which:

FIG. 7 is a block diagram of the clock of FIG. 6;

FIG. 8a is a block diagram of the latches and load logic of FIG. 7;

FIGS. 8b, 8c and 8d illustrate various signals for operating the block diagram of FIG. 8a;

FIG. 9 is a block diagram of the sign and count logic and bias up or down logic of FIG. 6;

FIGS. 10a-10d illustrate how the M factor table may be generated;

FIGS. 11a-11d, 12a-12d, 13-a-13d and 14a-14d represent predicted performance;

FIGS. 16a-16c illustrate predicted performance in a fast flyback mode as a function of time;

FIGS. 17a-17b illustrate predicted performance in a fast flyback mode as a function of position; and FIGS. 18a-18f illustrate various software modules employed in the processor.

DETAILED DESCRIPTION OF PREFERRED EMBODIMENTS

Figure 1:
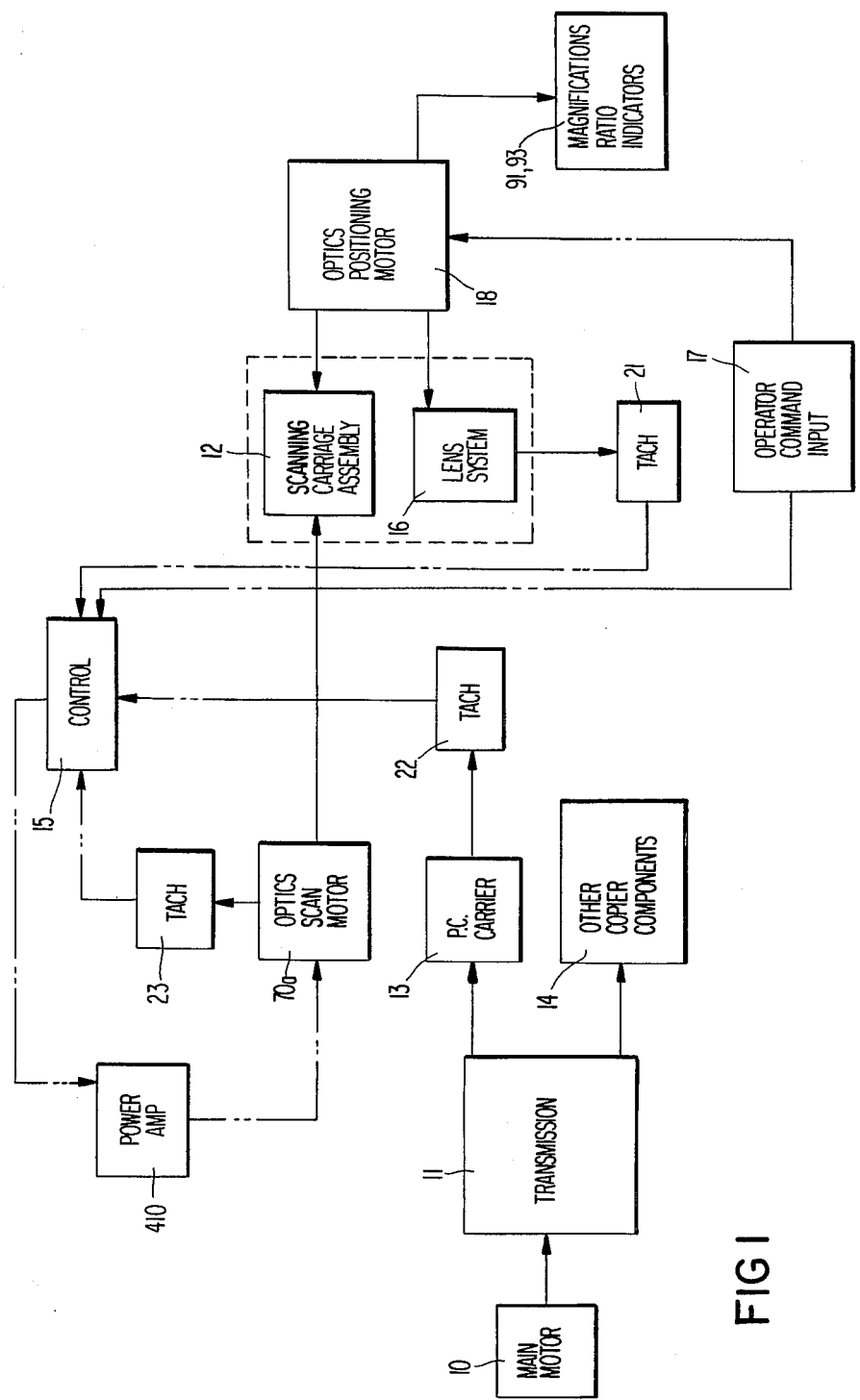
FIG. 1 is a block diagram of a copying machine.

FIG. 1 shows a block diagram of preferred embodiments of the invention; in FIG. 1, major components or subsystems are shown in block diagram fashion, solid lines indicate mechanical couplings and broken lines indicate electrical couplings. A main motor 10 is connected through a transmission 11 for driving the image carrier 13 (which may be a drum) and to other major copier components 14. A lens positioning system 16 positions the lens in response to operator command inputs at 17 via a motor 18. As the motor 18 changes lens position, indicators 91, 93 provide the operator with information which indicates when changes in reduction ratio can be terminated. The same motor 18 provides carriage positioning for total conjugate length (TCL) correction to insure correct total conjugate length, as indicated by the coupling between the motor 18 and the scanning carriage assembly 12. As explained in the first referenced application, total conjugate length must be adjusted as the reduction mode is changed. Finally, a control 15 responds to a variety of inputs including lens tach 21, carrier (drum) tach 22, a motor tach 23, and various operator input commands 17 such as the number of copies to be produced, to properly control the scanning carriage assembly 12 for document reproduction. Control 15 develops an analog drive signal that is an input to the power amplifier 410 that drives the optics scan motor 70a. Rotation of the optics scan motor is monitored by tach 23. The output from tach 23 is fed back to control 15.

Figure 2:
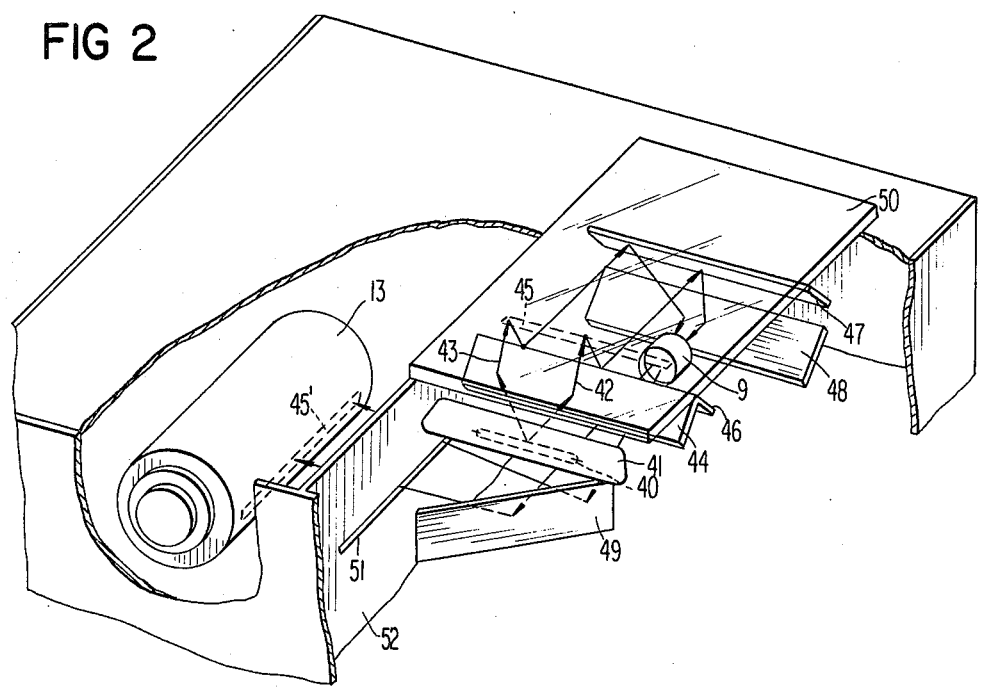
FIG. 2 is a partially cut away section illustrating the optical path.

FIG. 2 illustrates the physical relation between the major components used in transferring an image from a document to the image carrier. A document to be copied, usually of rectangular shape, is placed on a glass platen or support 50. The document may be centered along a reference edge or corner referenced. Regardless of how the document is positioned, a scanning carriage assembly located under the document glass moves across the under surface of the document exposing the document with a long rectangular and moving area of light henceforth referred to as a moving line of light 45. The assembly includes a pair of carriages, one carrying a light source 40 and a reflector 41, as well as reflectors 44, 46 and a second carrying the reflectors 47, 48 (the carriages and the rails on which they travel have been deleted from FIG. 2). The reflected image from the moving line of light is directed through an optical system including the reflectors 46-48 and a lens 9 to a stationary reflector 49 and then to an image carrier 13 (hereinafter referred to as a rotating drum, the surface of which may be comprised of a photodetecting material carrying electrical charge). The reflection from the moving line of light produces a line image 45' of the illuminated portion 45 of the document. The speed relationship between the scanning carriage assembly and the tangential velocity of the drum is constant and of a desired ratio (during image transfer) to give the desired reduction, for example a 1:1 speed ratio provides for a full size reproduction. As a result of the scan, an electrophotographic latent image of the document is produced on the photodetector. This image is then passed through a developer station in which toner material is deposited on the latent image causing the toner to adhere to certain areas of the photodetector and not to others, depending on whether or not light has been transmitted to the drum discharging the electrical charge previously placed thereon. In plain paper copiers, the developed image is then passed through a transfer station where the toner image is transferred to a copy paper sheet. The copy paper is then passed through a fusing station wherein the toner is fused to the paper to permanently affix the image. Meanwhile, the drum may continue to rotate through a cleaning station where residual toner charge is removed from the surface of the drum prior to beginning the next copy cycle. In a preferred embodiment, the developer performs the cleaning function during a second drum revolution or during the next drum revolution in conjunction with development of another image of the same document.

In coated paper copiers, the same basic operation occurs except that the photoconducting material is located on the copy paper itself. Accordingly, the speed of the scanning and the speed of the copy paper during the image transfer process must be matched in the appropriate ratio for the selected reduction. The present invention is applicable to both plain and coated paper copiers.

In the typical electrophotographic plain paper copier, the leading edge of the copy paper must be brought into juxtaposition with the drum at the transfer station to coincide with the leading edge of the image area. If the document to be copied at a 1:1 ratio onto a copy sheet of exactly the same size, it is also necessary to provide the leading edge of the document image at the leading edge of the image area so that the entirety of the document can be transferred to the copy sheet. The same holds true when a larger document is being reduced so that the entire document image completely fills the image area of the drum. Typical document copiers such as the IBM Copier II or Series III provides the necessary mechanism for timing the relationship of copy paper leading edge to image area in order to provide this function. The same function is performed in coated paper copiers except that the leading edge of the copy paper must match the leading edge of the image.

Figure 3:
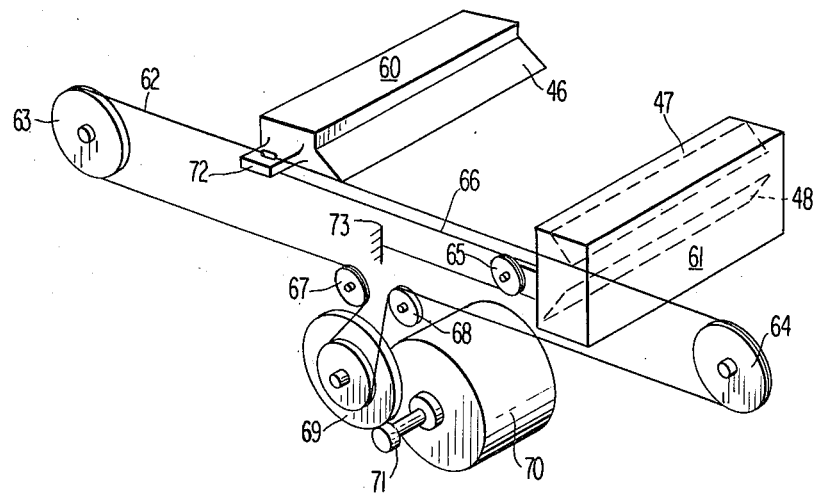
FIG. 3 illustrates the scanning carriages and the driving arrangement.
Figure 4:
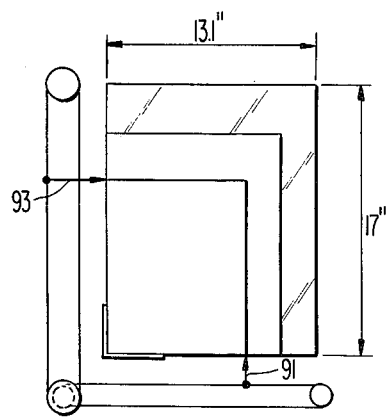
FIG. 4 shows the indicator for guiding the operator as to the reduction mode.
Figure 5:
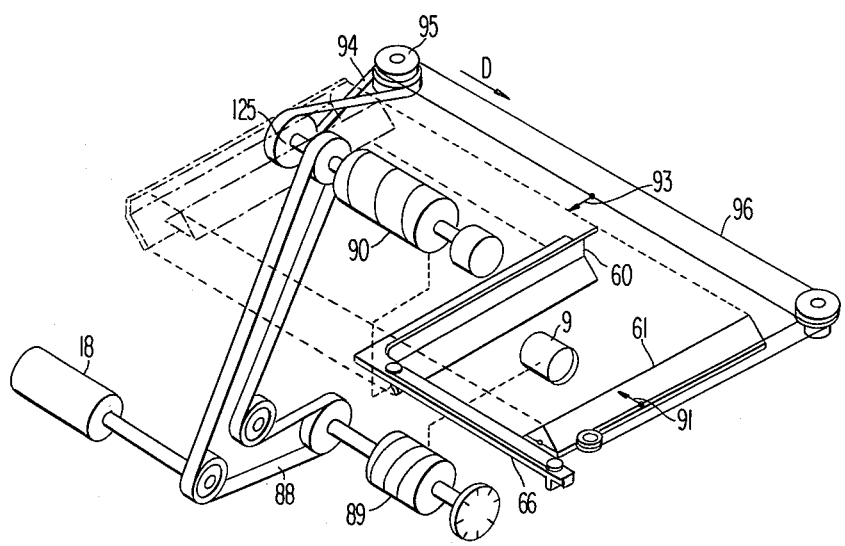
FIG. 5 illustrates the manner in which TCL correction is effected.

FIGS. 2a and 2b and the associated text of the first referenced application describe the need for TCL correction while FIGS. 4, 5 and the associated text describe how the respective carriages are positioned and moved to alter the TCL correction for various reduction ratios and to maintain the correction throughout the scanning movement of the carriages. The need for TCL correction is identical in the present invention and the correction is achieved in a similar fashion. More particularly, FIG. 3 is a schematic showing of a pair of carriages, a first carriage 60 and a second carriage 61, which move across the document glass 50 to move the line of light from one end of the document glass to the other. Scanning carriage 60 includes the source of illumination (not illustrated) and the first mirror 46. The scanning carriage 61 carries the mirrors 47 and 48. The two scanning carriages 60 and 61 are mounted for movement along the rails by belts or bands 62 and 66. The first belt 62 comprises an endless belt which is connected to an arm 72 of the first carriage 60. The endless belt 62 is supported over pulleys 63, 64 and 67, 68 and is driven by a drive pulley 69 which itself is driven from the drive shaft 71 of a servo motor 70a. Thus, the movement of carriage 60 is proportional to the rotation of the drive shaft 71 as reflected by the ratios of the driving elements of the pulley 69. The carriage 61 is driven through a belt or band 66 which extends from a ground point 73 over a pulley 65 supported on the carriage 61 and which terminates at the arm 72 of the carriage 60. Because of the motion multiplying arrangement, shown in FIG. 3, the movement of the two carriages is not equal, but carriage 61 moves exactly one half the distance moved by carriage 60, and this maintains the total conjugate length constant as is taught in the first-mentioned application. In the remaining part of the application, the motion of the carriage 60 will be referred to as motion of the scanning carriage drive assembly, it being understood that motion of the carriage 61, while not equal to the motion of the carriage 60, is related thereto. Of course, other driving arrangements can be implemented well within the ordinary skill, such as other composite cables and pulley arrangements, steel bands instead of cables, or a nut and lead screw arrangement.

FIGS. 4 and 5 (the former reproduced from the aforementioned first-referenced application, and the latter somewhat modified) illustrate the scanning carriages 60 and 61 (the rails on which these carriages ride are not illustrated for clarity) along with the lens 9 (likewise, the rails on which the lens 9 rides are also not illustrated for clarity). Also illustrated in these Figures is apparatus for feeding back information to the operator to inform him when the lens is correctly positioned for the document intended to be copied. The document is positioned in the document glass in the manner shown in FIG. 4, at the reference corner. Positioning indicators 91 and 93 are moved simultaneously by the operator to encompass the outer edges of the document in two dimensions. By observing the position of the indicators 91 and 93, relative to the document, the operator knows when he has the system adjusted such that the entirety of the document is encompassed by the indicators and will therefore be transmitted to the document image area when he initiates the copying process.

As shown in FIG. 5, indicating pointers 91 and 93 are operated by optics positioning motor 18, a cable 88, pulley 125, cable 94 and pulley 95. If pulley 95 is rotated in direction D, then cable 96 rotates to move positioning indicator 93 in a direction to encompass a larger and larger document. Similarly, positioning indicator 91 moves to encompass a larger document along the other dimension. The positioning indicators 91 and 93 may move at any selected ratio depending upon the nominal sizes of paper most frequently copied.

Under operator control, therefore, the motor 18 is rotated in one direction or another depending on whether or not a larger or smaller document is to be copied than the document size indicated by the position of the indicators. Assuming a larger size document is to be copied, the motor is energized in a particular direction and the indicators 91 and 93 are moved accordingly. At the same time, the cable 88 rotates the lens cam 89 which is coupled to the lens 9 for proper positioning thereof so that when the operator de-energizes the motor 18, the lens is properly positioned for the desired reduction. The required motion of lens 9 as a reduction mode is varied, is adequately disclosed in the first referenced application.

The same movement of the cable 88 also provides for rotation of the cam 90 which serves, as is disclosed in the aforementioned first referenced application, to adjust the ground point 73 so as to properly position carriage 61 for the associated total conjugate length in accordance with the desired reduction mode.

It should be apparent, therefore, that the operator control in locating indicators 91 and 93 results in positioning the lens 9 and the carriage 61 at a selected position within a continuous range corresponding to the selected reduction mode in a continuous range of reduction modes.

The Control System

In accordance with the foregoing discussion, the object of the control system is to provide a driving signal to the servo motor 70a (FIG. 6) of such a magnitude and polarity that the scanning carriage assembly describes a movement whose acceleration velocity and position profile with respect to drum velocity is both controlled and repeatable, to an initial position tolerance which is substantially less than 0.25 mm, and in a fast flyback mode of operation, the repeatable position tolerances are on the order of 0.1 mm. The control is effected by employing a single servo loop.

Figure 6:
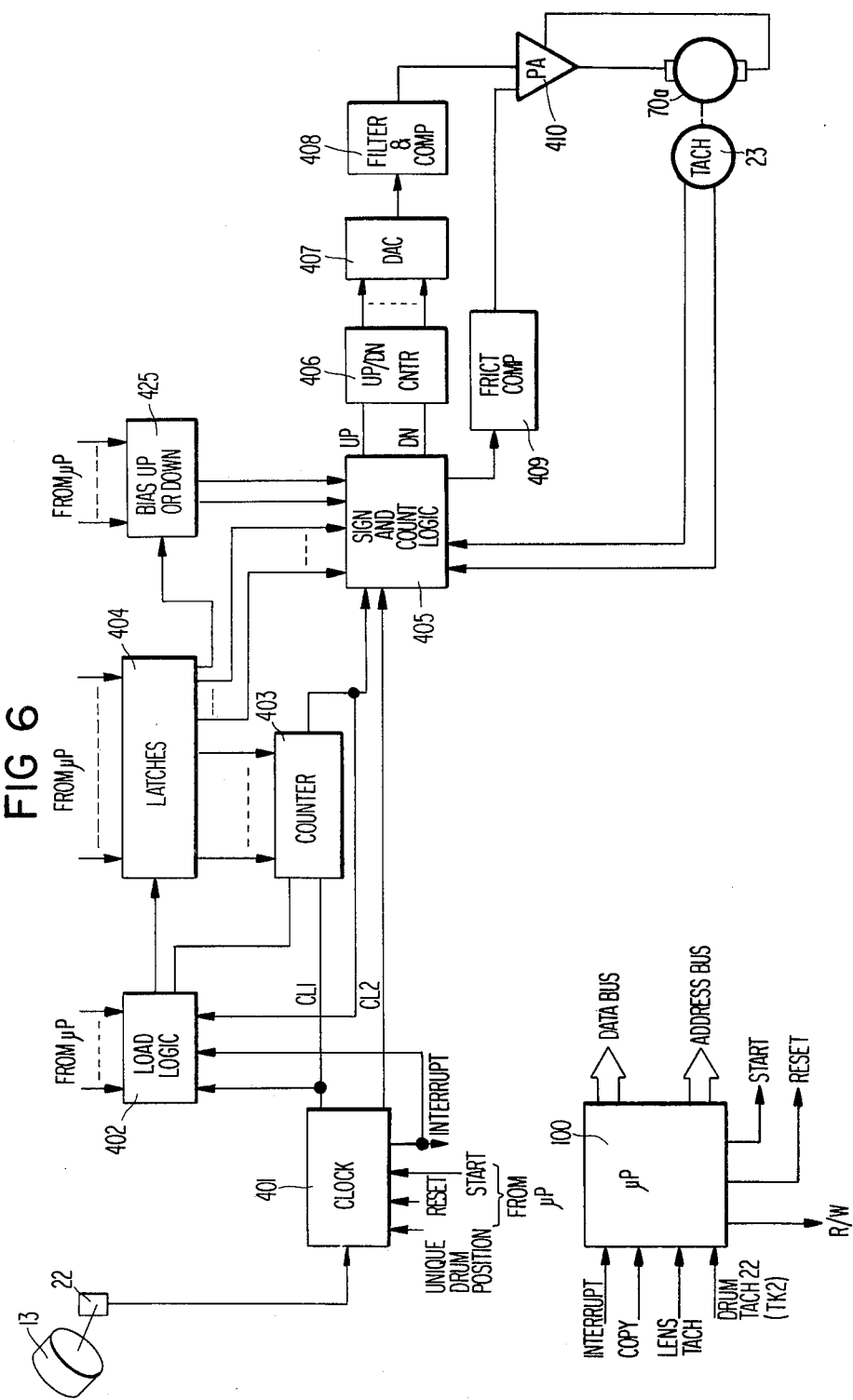
FIG. 6 is a block diagram of the control apparatus for driving the scanning carriages.

As shown in FIG. 6, that servo loop includes an up/down counter 406 (sometimes referred to as an error counter), the output of which is coupled to a digital to analog converter 407, the analog output of which is coupled thorough a filter and compensation network 408 to a power amplifier 410 which supplies the driving signal to the servo motor 70a, in conjunction with a friction compensation network 409. The feedback loop is completed by employing a tachometer 23 which responds to motion of the motor shaft and produces a pair of pulse trains, the repetition rate of each representing velocity, and the phase relationship representing direction of motion. The tachometer signals are coupled to a sign and count logic circuit 405 where the pulse trains are converted into either an up or down pulse train and coupled to an appropriate input of the up/down counter 406. The driving input to the servo loop is also coupled through the sign and count logic 405 and is represented as either an up or down pulse train, each pulse representing a desired increment of movement. The manner in which the driving pulse train signal is produced will now be explained.

The driving signal pulse train is produced by the combination of the microprocessor 100, clock 401, load logic 402, latches 404 and a counter 403. Briefly, the counter is initially loaded and is counted down at a predetermined rate, particularly a rate having a specified relationship to the velocity of the drum. When a number loaded in the counter 403 is counted down to a predetermined count, for example zero, a borrow pulse is produced, and the driving signal pulse train is made up of a plurality of such "borrow" pulses. Accordingly, it should be apparent that the repetition rate of the "borrow" pulses is directly related to the quantity with which the counter 403 is initially loaded. In practice, a predetermined sequence of quantities is provided to load the counter 403 such that the desired motion is produced.

Those skilled in the art will readily understand that down counting a predetermined quantity to produce a "borrow" pulse is not essential to the invention, and in entirely similar fashion, by using the complement of the quantity, the counter could be initially loaded with such complement, and up counted to a "carry" pulse. A further alternative is to merely step a counter, in either direction, and continually compare the state of the counter with the predetermined quantity, and to produce the driving signal pulse train and reset the counter to zero when the counts compare. Any of these techniques simply represent techniques to change the short term modulus of the counter or the short term repetition rate of the output. For example, changing the modulus of the counter 403 changes the number of counts needed to produce a driving signal pulse. The selected acceleration, velocity and position profile can be achieved by supplying a predetermined sequence of such quantities with which the modulus of counter 403 is altered.

Accordingly, clock 401 responds to a pulse train from the drum tachometer 22, to produce an output pulse train having a frequency or repetition rate related thereto. Actually, a pair of pulse trains are produced, represented by clock 1 and clock 2 (CL 1, CL2). In order to insure precise repeatability, the clock 401 is synchronized to the drum tachometer 22 so that any position on the drum corresponds to a predetermined number of clock pulses output by the clock 401. In addition, the clock produces an interrupt signal at a rate fixed with respect to the velocity of the drum and synchronized therewith; accordingly, on each cycle of the drum, the interrupt signals are produced when the drum is in identical position. The interrupt signal is employed in two locations—it is coupled to the load logic 402 which controls loading of the counter 403 and it is also coupled to the microprocessor 100 wherein the microprocessor 100 responds to each interrupt by performing a predetermined sequence of tasks, the ultimate result of each of which is to produce on the microprocessor's data and address bus selected signals, the signals on the data bus representing a quantity which will eventually be loaded in the counter 403, and the signals on the address bus representing identication of the data appearing on the data bus. Since the microprocessor 100 is a poorly timed device, relative to the precise timing requirements for the control circuit, the signals appearing on the data bus are buffered by the latches 404 prior to being loaded in the counter 403, so that the repeatability of the motion reflected by the scanning carriage assembly is not governed by the poor timing of the microprocessor 100. Accordingly, in response to a particular interrupt, data appearing on the data bus is latched into the latch 404. Following loading of latches 404, the counter 403 is loaded with a new quantity and begins counting. After a delay related to the newly loaded quantity, a "borrow" pulse is produced. At this time, the counter may be reset to the new quantity previously loaded into the latch or a still further quantity, as will be explained below. In this fashion, the delay between "borrow" pulses or the pulse repetition rate can be selected.

As illustrated in FIG. 7, the clock 401 includes a phase detector 411 to which is coupled the pulse train from the drum tachometer 22. The output of the phase detector is provided as a control signal to a (voltage controlled oscillator) VCO 412 which therefore produces a signal with a frequency which is controlled in relation to the repetition rate of the pulse train from the drum tachometer 22. The signal of controlled frequency from VCO 412 is coupled to the clock circuit 413 which produces two non-overlapping output pulse trains, each pulse train having exactly one half the repetition rate of the VCO frequency, and the two clock pulses appearing alternately; these are CL 1 and CL 2 (see FIG. 8b). One of the two clock pulses, CL 2 is coupled to a counter 414, and provides the up counting input. The output of counter 414, representing a "carry" is coupled as the other input to the phase detector 411. Thus, phase detector 411, VCO 412, clock circuit 413 and counter 414 form a phase locked loop. Several stages of the counter 414 are brought out as inputs to a decode and latch circuit 415 with an output, forming one input to an AND gate 416, which is effective when the counter 414 is in a specified state. In addition, one stage of counter 414 provides the up counting input to a second counter 417, and the output from one stage of the counter 417 is the interrupt signal mentioned above. Accordingly, the repetition rate of the interrupt signal is controlled in relation to the velocity of the drum. In addition, since the enabling input determines when counter 417 begins counting the output of counter 414, properly timing the enable signal means that the starting or first interrupt signal can be referenced to predetermined locations on the drum. This is effected by using a unique position of the drum derived from a second track from drum tachometer 22 of FIG. 6 to partially enable gate 416, thereby properly timing the enable signal. The up originated start signal (see FIG. 6) identifies the next pulse from the unique emitter track (from the drum tachometer 22) as the time that the servo controlled scan of the scanning carriage should start. By means of the decode circuitry 415 a small time delay is inserted before starting until we are at a predetermined state in counter 414. This is required for exact repeatability and predictability of the pulse train generated by counter 414. This repeatability is particularly required by the fast flyback sequence to be explained later. As a result of the foregoing, the clock signals CL 1 and CL 2, the interrupt signal, and the pulse train generated by counter 403 are all in an exact and predictable timing with respect to the VCO (412) output pulse train from one copy to another. Since the VCO is phase locked to the drum tachometer 22, the repetition rate is tied to drum velocity and various pulse trains are produced in relation to specific drum positions, and this relationship is maintained from one copy to another. Accordingly, the first leg to satisfy the repeatability requirement is satisfied in that the output of clock 401 is synchronized to the drum position and velocity.

FIG. 8a illustrates the load logic 402 and the specific configuration of the latches 404 and the manner in which counter 403 is loaded and counted. More particularly, three sets of latches 404a, 404b and 404c are provided. The counter 403 is loaded from latches 404c which is loaded in turn from latches 404a and 404b. The latches 404a and 404b buffer the output of the processor so that its relatively poor timing has no effect on the control circuit. Thus, a decoder 420 produces either a LOAD A or a LOAD B signal which are coupled respectively to latches 404a and 404b for loading the same from the microprocessor data bus. The LOAD A or the LOAD B signal is produced only in the presence of CL 1, and are differentiated based upon a particular address accessed by the microprocessor and decoded by the decoder 420.

In a somewhat similar fashion, the decoder 421 provides an output to an OR gate 423, whose output is the signal LOAD C. Similar to decoder 420, decoder 421 produces the output which may result in LOAD C based on a particular microprocessor address, and synchronized with CL 1. This manner of producing LOAD C is only employed to initialize the control circuit. During normal operation, the interrupt signal (synchronized with CL 2) is coupled through the OR gate 423 to provide the signal LOAD C. Since latches 404c are loaded on CL 2 time, and counter 403 is loaded on CL 1 time, the two operations will not interfere with each other.

The counter 403 is loaded with the quantity in latch 404c when the signal LOAD COUNTER is produced by AND gate 422. This signal is produced in conjunction with the clock signal CL 1 and the COUNT output of the counter 403 which output represents a "borrow". The counter 403 is clocked by the output of the gate 424, whose inputs are the enable signal (see FIG. 7, 416) and the signal CL 1. Accordingly, once the enable signal is produced, the counter is counted down at the rate of CL 1. Only when the counter is completely counted down to produce a "borrow" is it loaded with the quantity in latch 404c. The quantity in latch 404c may be replaced at the rate of the interrupt signal, assuming that the quantities in latches 404a and 404b have been altered. Two latches, 404a and 404b, are employed because the microprocessor is byte oriented and the quantity needed to load counter 403 is larger than a byte (in one embodiment, counter 403 was a 12 bit counter). Those skilled in the art will understand that if the microprocessor supplied a sufficiently large number of bits, or if the number of bits required to load the counter 403 matched the output capability of the processor, one of the two latches 404a and 404b could be eliminated.

Summarizing the operation of latch 404 counter 403 combination: the interrupts which occur synchronized with drum rotation perform two functions; firstly, initiating a transfer from processor 100 to latches 404a and b sometime after the interrupt and initiating a transfer of a previously loaded quantity from latches 404a and b to latches 404c at the time of the interrupt. The "borrow" pulse initiates a transfer from latches 404c to counter 403. By reason of the parameters chosen in an embodiment which has been constructed, the interrupt rate is about once every 3.5 msec. (the exact rate depends on the velocity of the drum); the length of counter 403 (12 bits) coupled with the CL 1 clock rate (about 1.3 MHz.) results in the counter 403 counting to a borrow at least twice for every interrupt. Accordingly, the servo loop operates asynchronously with respect to processor 100 within the limitation that processor 100 must responds to an interrupt in less time than the delay between interrupts (about 3.5 ms.). As a result, the output pulse rate of counter 403 does not change between interrupts. If desired, the counter 403 could be loaded immediately at the time of each interrupt. This could result in one pulse period which is abnormally short if a "borrow" pulse were generated at the reloading time. Since this would only occur once per interrupt, satisfactory operation could probably be obtained.

The operation of the load logic 402 and the counter 403 can be explained in connection with FIGS. 8b through 8d.

FIG. 8b shows typical waveforms, the pulse sequence on the line labelled drum tach 22 (TK1) represents the input from the drum tachometer 22 track #1 (for example, at about 567 Hz.) to the clock 401. The next line illustrates the pulse sequence produced in the clock circuit 413 which is at the rate of the output of VCO 12 (for example, at about 2.3 MHz.). Immediately below this line CL 1 and CL 2 are illustrated. In initializing the control circuit, the microprocessor 100, in response to operation of the copy signal, which is produced in response to operator action, causes the microprocessor to interrogate the memory location corresponding to the LOAD A signal. This is output on the data bus and coupled into the latch 404a at LOAD A. Likewise, on a succeeding instruction, a memory location is accessed corresponding to decoder 420 such that the signal LOAD B is produced, and the corresponding data output on the data bus is coupled into the latch 404b. These two operations transfer a first M-factor table entry to the control loop. On a succeeding instruction, a further memory location is accessed corresponding to decoder 421 such that the signal LOAD C is produced which serves to latch the contents of latches 404a and 404b into latch 404c. The processor 100 then accesses second entry in an M-factor table and causes it to be transferred to the latches 404a, b. Following this operation, processor 100 monitors drum position via drum track #2 and produces the START signal prior to the production of a suitable pulse from drum tachometer (TK 2) to partially enable gate 416 (FIG. 7). At this same time the RESET is removed from counters 414, 417 and latches 415, 418. Thus, the appropriate drum tach 22 (TK 2) pulse serves to set latch 418 (FIG. 7) to further partially enable gate 416. With the removal of RESET counter 414 begins counting and at an appropriate time (when its output matches the latch 415) latch 415 outputs a pulse to fully enable gate 416. This output is ENABLE which is used to begin counting at counter 417 and through gate 424, at counter 403 (FIG. 8a). This is the beginning of completely synchronized and repeatable operation of the servo loop. By using a high count rate for counter 414, e.g., $1.3 \times 10^6$ pulses/sec., and ensuring it cycles relatively rapidly compared to drum movement, the time error between the drum reaching an appropriate position and production of the ENABLE signal is so short that it is negligible even for the tight tolerances required here. When the ENABLE signal is produced, counter 403 begins to count down. As will become clear, the counter 403, when not counting, is retained in a zero state so the first count will produce the "borrow" which, on the next CL 1 time, cause the contents of latch 404c to be loaded and the counter 403 will count this quantity down.

The preceding operation is represented in FIG. 8c which illustrates the LOAD A, the LOAD B and LOAD C signals transferring the quantity $M_1$ and the succeeding signals transferring $M_2$. The $M_1$ quantity is counted down to a "borrow" and thus produces the signal COUNT which also causes the counter to be reloaded with the quantity in latch 404c.

The same interrupt signal also produces the signal LOAD C but since the quantities in latches 404a and 404b have, as yet, not been changed, the latch 404c does not change its condition. After approximately 3.5 msec. which is determined by counters 414 and 417, an interrupt is produced resulting in the quantity $M_2$ loaded into 404c from 404a and b. This signal, at the processor, produces the LOAD A and LOAD B signals which result in the quantity $M_3$ being loaded in the latches 404a and 404b.

FIG. 8d illustrates this operation at an exemplary point in operation of the control circuit. Thus, the latches 404a and 404b are loaded with a quantity $M_n$ and on the subsequent interrupt, latch 404c is loaded with that quantity. The next time the counter 403 produces a "borrow" the quantity $M_n$ is loaded therein. The interrupt which causes the quantity $M_n$ to be loaded in the latch 404c, however, also stimulates the microprocessor so that at some later time, the signals LOAD A and LOAD B are produced, loading new quantities ($M_{n+1}$) into those latches. However, the quantities in the latches 404a and 404b are not effective until a further interrupt is produced to generate the signal LOAD C, at which time quantities ($M_{n+1}$) are loaded into the latch 404c, from which they are available at the counter 403 on the next production of the "borrow". From the foregoing, it should be apparent that the repetition rate of the signal COUNT is determined by a quantity loaded into the latch 404c and thus the repetition rate of the signal COUNT can be varied by merely preselecting the signals emitted by the microprocessor.

When a scan or rescan cycle approaches its conclusion, latch 404c has the last M-factor loaded. This M-factor has a control bit set to indicate the carriage is to stop (called the stop lock bit) and also serves to zero counter 403. When the latch is loaded that control bit prevents further COUNT pulses from being effective. However, as the carriage may continue to move the tach 22 pulses are used to change the state of counter 406. This has the effect in a next cycle (if a scan following a rescan) of retaining any such "error" and such "error" in the initial position can be corrected. Furthermore, as will become clear hereinafter, at the conclusion of a scan or rescan, the processor will not produce any further M-factors in response to any further interrupts. Accordingly, counter 403 is reloaded with the "zero" quantity, and thus can begin further cycles at a zero condition.

Table I, reproduced below, corresponding to FIGS. 11a–11d, illustrates this operation for a preferred embodiment of the invention which has been constructed in which the counter 403 is a 12 bit counter. The period of the interrupt signal is about 3.5 milliseconds (for a drum rotating at about 50 rpm.). The first column indicates various M factors, and the second shows that for the quantity M (1959) the period between COUNT pulses is 1.688 milliseconds. The next column illustrates this delay corresponds to a pulse rate of about 592 pulses per second from counter 403. As shown in the fourth column, that is about 2.09 counts in the period between interrupts. However, since the counter 403 must be completely decremented before it is reloaded, the quantity M results in three (3) counts from the counter. Likewise, loading the counter 403 with an M-factor of 214 corresponds to 18 counts between interrupts or about 4981 pulses per second. From reviewing Table I, it should be apparent that by properly selecting the M-factor, almost any desired repetition rate can be obtained within a range determined by the repetition rate of CL 1 and the length of the counter 403.

TABLE I

| No. of CL 1 M | Delay Between Counts (MS) | Approximate Rate (pps) | No. Counts Bet. INTER | Result No. of Counts |
|---|---|---|---|---|
| 1959 | 1.688 | 592 | 2.09 | 3 |
| 1082 | .932 | 1073 | 3.79 | 4 |
| 613 | .5282 | 1893 | 6.68 | 7 |
| 454 | .391 | 2556 | 9.02 | 10 |
| 378 | .326 | 3070 | 10.84 | 11 |
| 328 | .283 | 3538 | 12.49 | 13 |
| 275 | .237 | 4220 | 14.89 | 15 |
| 233 | .201 | 4981 | 17.58 | 18 |
| 214 | .184 | 5423 | 19.14 | 20 |
| 208 | .179 | 5580 | 19.69 | 20 |
| 206 | .176 | 5634 | 19.88 | 20 |
| 200 | .172 | 5803 | 20.48 | 21 |
| 186 | .160 | 6239 | 22.02 | 23 |
| 175 | .151 | 6632 | 23.41 | 24 |
| 168 | .145 | 6908 | 24.38 | 25 |
| 164 | .141 | 7076 | 24.98 | 25 |
| 162 | .140 | 7176 | 25.28 | 26 |

Table I illustrates a typical acceleration M-factor table. In all the copier reduction modes of operation we need to accelerate, scan at constant velocity, decelerate and stop. The microprocessor 100 accomplishes this by sending the control loop an M-factor table for acceleration similar to Table I. The constant velocity motion is achieved by then repeating the last M-factor number a fixed number of times corresponding to the desired image length. In an embodiment actually constructed, the number of times this is repeated is counted by the microprocessor 100. Obviously, this could also be counted by a logic circuit if desired. After the constant velocity phase the microprocessor 100 then sends the deceleration M-factor table and ends the routine with an M-factor number that contains a STOP LOCK control bit. The STOP LOCK signal logically turns off any count signals from the M-factor counter.

In the various reduction modes of operation, the same sequence of M-factor numbers is used during both rescan and the following scan with the exception that the sign bit is reversed. By using the same tables for rescan, and scan the controls automatically adjust the scan starting position for the particular reduction mode. Consequently, when the reduction mode is changed, the microprocessor 100 only needs to change the start position for rescan by a small amount using the BIAS UP and BIAS DOWN commands according to the values derived from delta X correction table.

FIG. 9 illustrates the sign and count logic 405 and bias up or bias down logic 425. Referring first to FIG. 6, the latches 404 store, in addition to the quantity which is down counted by the counter 403, several control bits; one of these control bits SIGN is coupled to the sign and count logic 405. Since the movement of the scanning carriage assembly is reciprocating, the SIGN bit determines the desired direction of movement, i.e., in rescan, the scanning carriage assembly moves away from the HOME position, and then in the scanning movement, moves toward the HOME position.

This control bit is coupled as one input to an AND gate 430, and the same bit, negated by inverter 432 is an input to gate 431. The output of the counter 403, COUNT, provides another input to each of the gates 430 and 431.

Finally, the ENABLE signal is a third input to each of these gates. Accordingly, depending upon the state of SIGN, either gate 430 or 431 produces a train of pulses in response to the train of pulses representing COUNT.

Also input to the sign and count logic 405 is the output signal from tachometer 23. These signals are input through the sign logic 433, which is merely a phase detector, and which produces an output TACH SIGN. This is a digital signal whose polarity represents the direction of movement of the scanning carriage assembly. One of the output signals from the tachometer 23 is also provided as an input to a gate 434, the other input to which is the clock signal CL 2. For each pulse from tach 23 the output of the gate 434 is one pulse synchronized to CL 2 corresponding to the leading edge of the tach output signal and each pulse representing an incremental movement of the output shaft of motor 70a, and therefore, an incremental movement of the scanning carriage assembly. The output of gate 434 is provided as an input to gates 435 and 436. Finally, the TACH SIGN is provided as an input to gate 435 and the same signal inverted by inverter 437 is an input to gate 436. Accordingly, in response to the train of pulses from tachometer 23, either gate 435 or 436 produces a train of pulses depending upon the direction of that motion. Since gates 430 and 431 respond to COUNT, which is synchronized with CL 1, and gates 435 and 436 respond to a pulse train synchronized to CL 2, the outputs of the gates 430, 431 on one hand, and 435, 436 on the other hand, are time displaced. The outputs of gates 430 and 435 are coupled to OR gate 438 and the output of gates 431 and 436 are coupled to gate 439. Accordingly, a train of COUNT pulses produce an output from gate 438 or 439, synchronized to CL 1, in dependence upon SIGN. Likewise, a train of tachometer pulses results in a train of pulses from either gate 438 or 439, synchronized to CL 2, and which of the gates produces the pulse train depends upon the direction of movement of the scanning carriage assembly. The output of gate 438 is coupled to the up counting input of counter 406, and the output of gate 439 is coupled to the down counting input of counter 406.

FIG. 9 also illustrates the bias up or down circuit 425. A decoder 440 responds to read or write not (R/W) and address bus signals from the microprocessor 100. When a particular location corresponding to decoder 440 is accessed in a read mode by the processor, the decoder 440 produces an output signal which is provided to gate 441, whose other input is CL 1. The single pulse output of gate 441 is coupled as an input to AND gates 443 and 442. Another input to gate 443 is a particular bit position of the data bus, for example, bit zero, whereas a second input to gate 442 is a different bit position on the data bus, for example, bit one. In addition, a third input to each of these gates is the stop lock signal provided by the processor 100 as one of the control bits from latches 404c only when the scanning carriage assembly is not in a rescan or scan movement condition (i.e., as part of the last number M loaded in 404c). The output of gates 443 and 442 are coupled, respectively, to OR gates 438 and 439. The bias up or down circuit 425 in conjunction with the processor 100 allows the up/down counter 406 to be incremented or decremented each time a particular memory location is accessed. This capability allows the microprocessor to move the carriage at a slower speed than would be allowed by the counter 403 for diagnostics or a slow speed bias towards home routine (used to find the home position initially) or to make small corrections in the scan start position as required by the multiple reduction modes.

From the foregoing, it should be apparent that the control circuit of FIG. 6 produces a driving pulse train (COUNT) whose repetition rate is determined by the quantities loaded in the counter 403, and which, at the same time, is synchronized in reference to the position and velocity of the drum 22.

M Factor Table

The key to achieving the desired position and velocity profile is a selection of the quantities which are loaded in the counter 403, and decremented thereby.

Generation of the table, for a particular movement, that is, a movement including a "constant velocity" phase at a selected velocity, begins by selecting a desired acceleration profile for the acceleration phase of the movement. FIG. 10a illustrates such an acceleration profile, labelled "ideal", plotting acceleration versus time in sec. In order to achieve this acceleration profile, the current signal to the motor 70a and the voltage signal applied to the amplifier 410 (FIG. 6) should take the form of the ideal acceleration profile of FIG. 10a. To create this signal at the input to the amplifier requires that the signal at the output of the digital-to-analog converter 407 take into account the transfer function of the filter and compensation network 408. Accordingly, this ideal acceleration profile signal is transformed by using the inverse transform of the filter and compensation network to determine the desired output of the digital-to-analog converter 407, also as a function of time. This is shown in FIG. 10a as the curve labelled "modified". At the same time, by integrating the ideal acceleration profile, an ideal velocity profile is obtained, FIG. 10b. Integration of the ideal velocity profile provides the ideal position profile, FIG. 10c. The ideal position profile is now modified by adding to it the modified acceleration profile from 10a divided by the gain (of the servo loop). This provides a modified position profile (FIG. 10c) which is differentiated to obtain the modified velocity profile (see FIG. 10b). The M-factor table is merely the inverse of the modified velocity profile sampled at a selected interrupt rate. For example, any given velocity corresponds to a repetition rate of COUNT, merely reading the velocity in the modified velocity profile, sampled at the selected interrupt rate provides us with sampled velocities, these can be converted into repetition rates, knowing the tachometer parameters. Fixing the nominal output of the clock, assuming the drum is travelling at nominal velocity, and selecting the counter size, we can determine the necessary quantity to provide the desired repetition rate. In this fashion, FIGS. 10a–10c can be employed to generate a table of M-factors or quantities for each interrupt. Once the table is computed in this fashion, each M-factor can be rounded so that it is a whole number, and adjusted so as to assure that it does not exceed the size of the counter. In addition, individual quantities can be adjusted so that at the completion of the acceleration phase, the scanning carriage assembly achieves a velocity as close to the desired velocity as possible. FIG. 10d shows a simulation of the resulting velocity profile as a function of time.

Computation of the M factors for deceleration is handled in the identical fashion. Constant velocity motion can be handled exactly as acceleration or deceleration in which case the M factor table has a number of identical entries necessary to produce the desired travel at constant velocity. In a refinement in order to save memory space, a control bit indicates that the associated M factor is to be repeated a predetermined number of times. (Note that the microprocessor can count the number of repeats on this could be handled by a hardware counter.) Thus, the interrupt signal results in reading the identical M factor until the predetermined number is attained, whereafter the processor reads again sequentially from the M factor table. The foregoing then provides the table of quantities which, when loaded in counter 403 in the order in which they appear in the table, will produce the desired acceleration, constant velocity motion and deceleration, to control the rescan movement, for example. The scan table can be identical except, of course, that SIGN bit will be different for rescan and scan.

To insure that the quantities are properly loaded into the counter, it is only necessary to insure that the processor sequentially emits the M factor table values in response to sequential interrupts. Since, as has been mentioned, the M factor is longer than a byte, each M factor is broken up and retained as two bytes. Each interrupt, therefore, causes the processor to emit, in sequence, the two bytes related to the desired M factor.

Figure 11A:
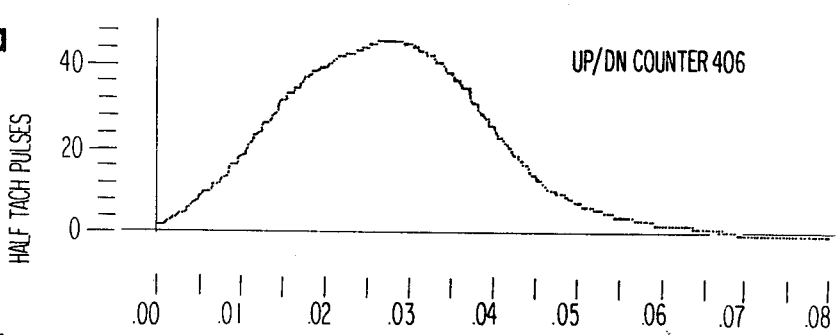
Figure 11B:
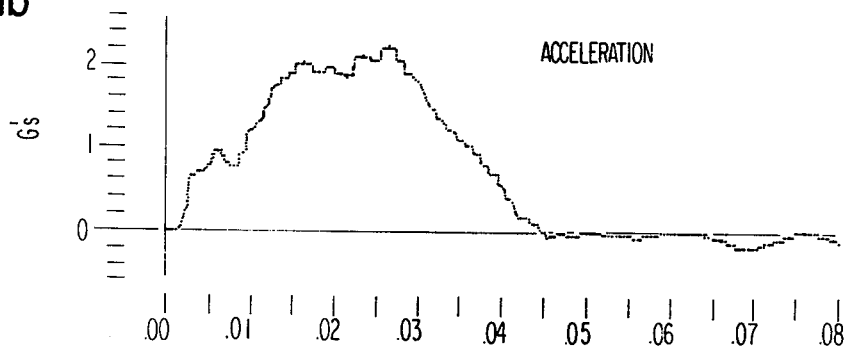
Figure 11C:
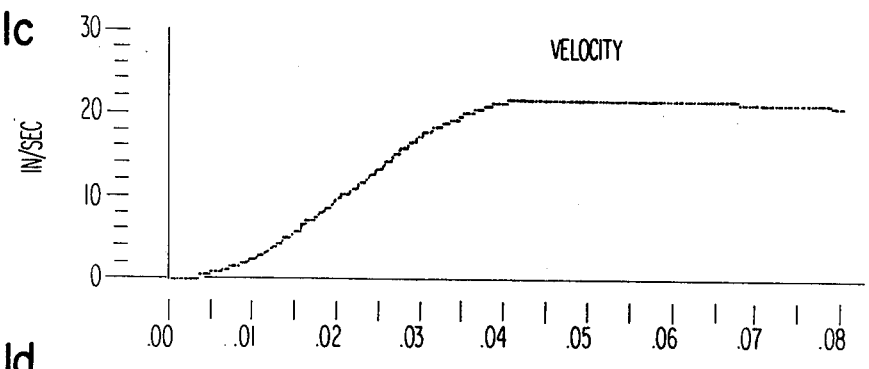
Figure 11D:
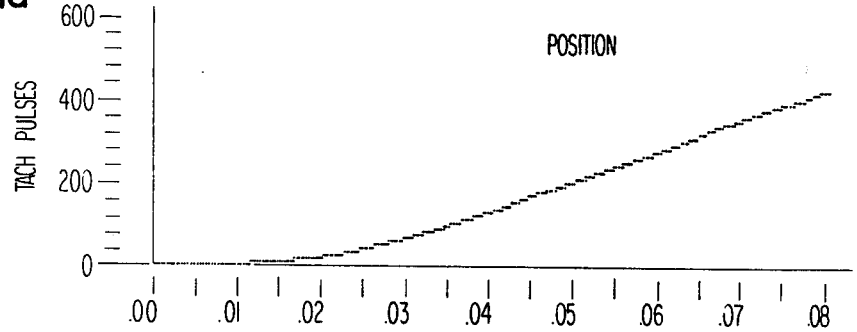
Figure 12A:
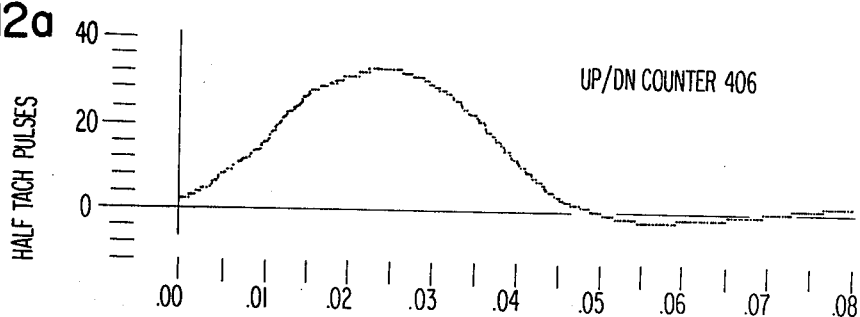
Figure 12B:
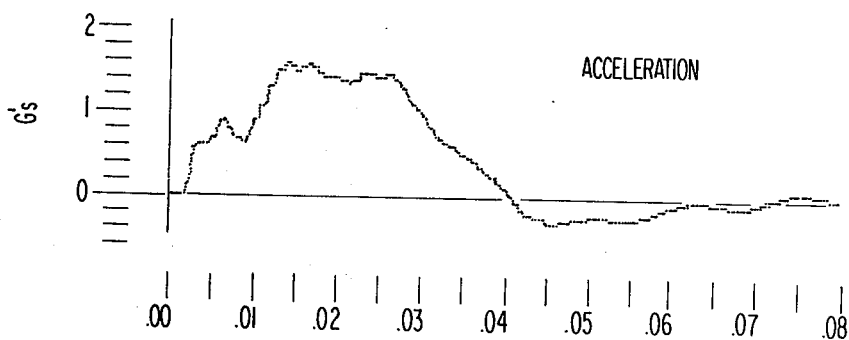
Figure 12C:
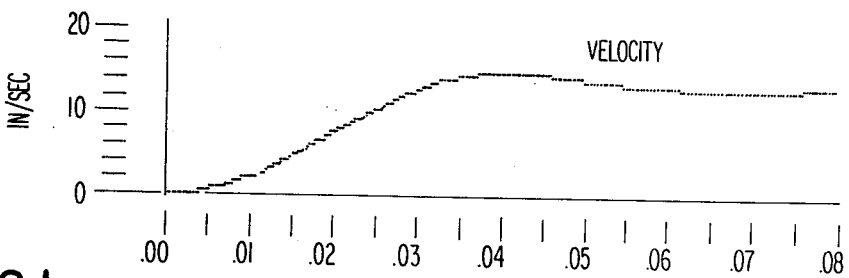
Figure 12D:
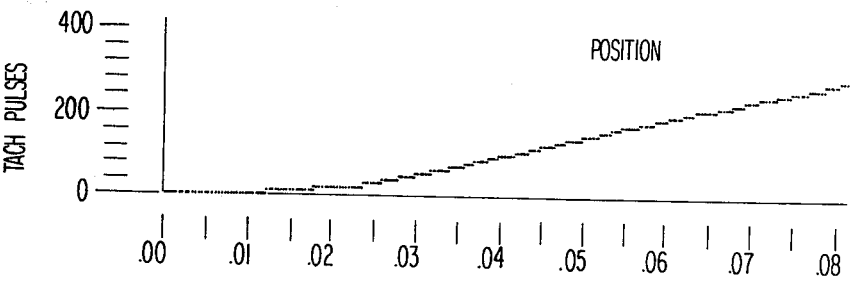
Figure 14A:
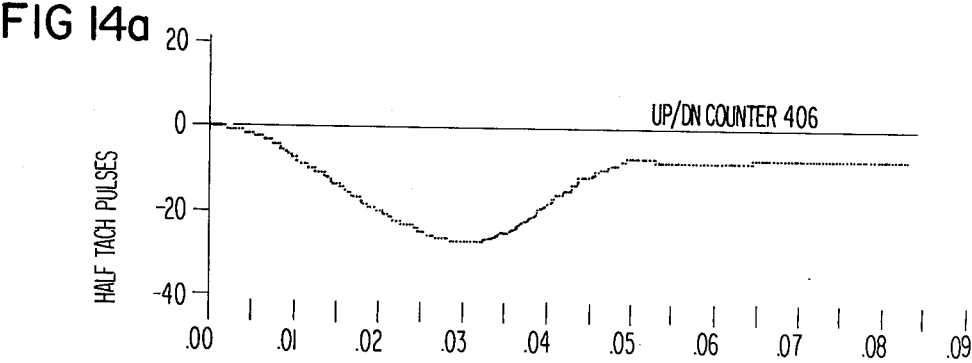
Figure 14B:
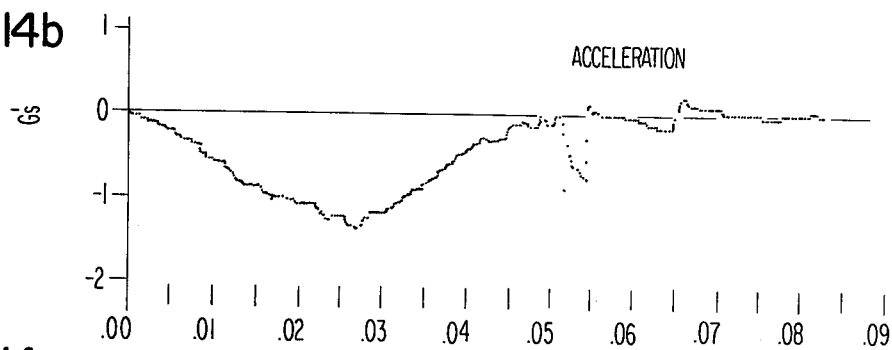
Figure 14C:
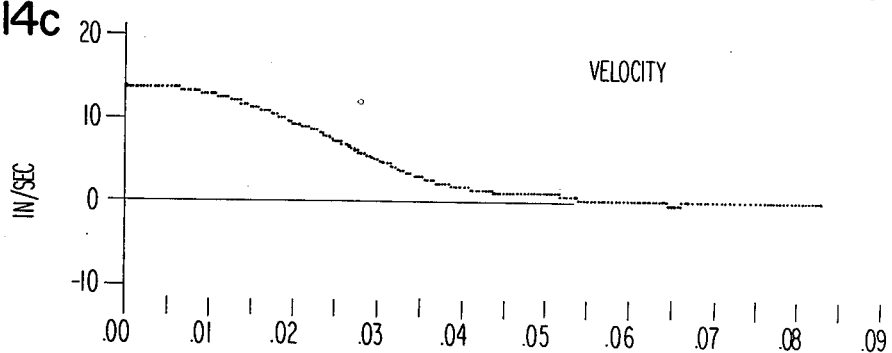
Figure 14D:
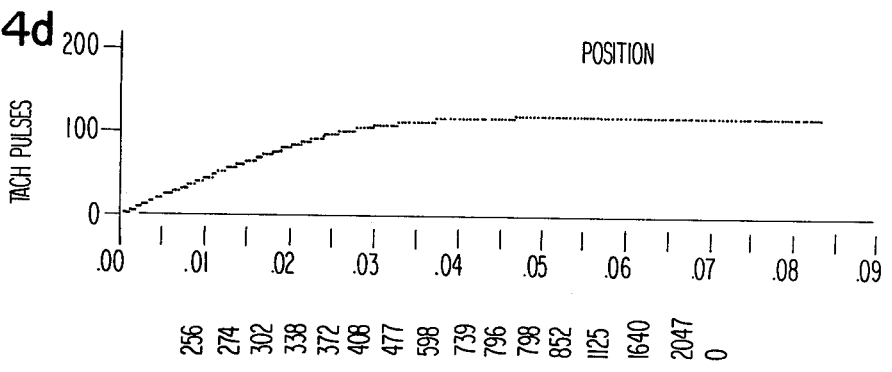

FIGS. 11a–11d illustrate predicted performance in achieving 21.5″/sec. velocity; FIG. 11a shows the contents of the up/down counter, FIG. 11b is acceleration, FIG. 11c is velocity and FIG. 11d is position, all as a function of time after start of scan. FIGS. 12a–12d are similar except they show acceleration to 13.605″/sec. FIGS. 13a–13d and 14a–14d are illustrations for deceleration from 21.5″/sec. and 13.605″/sec., respectively. Each of FIGS. 10–14 show the M factor table associated with the Figure, below FIGS. 10d–14d, respectively.

Note that each corresponding factor in the sets of M factor numbers used for acceleration for the two velocities in the examples are different by a count of 88. In other words, we can start with the table selected for acceleration to 21.5 in./sec. We then determine the constant M-factor number that we want to use for the constant velocity phase (250 for 13.6 in./sec.). A table offset value is then calculated by subtracting the last M factor in the 21.5 in./sec. table, 162 from 250 to obtain 88. An acceptable acceleration M-factor table for 13.6 in./sec. is then obtained by adding 88 to each of the numbers in the 21.5 in./sec. table. A similar procedure also applies for the deceleration tables.

If only a few scan velocities are required, unique M factor tables could be used for each velocity. However, in a machine with 90 different velocities corresponding to 90 different reduction settings to achieve continuously variable reduction capability, it is important to have a simple means to calculate acceptable M factor tables from one table to avoid having to store 90 acceleration and 90 deceleration tables.

Obviously, those skilled in the art could find many other simple means of generating acceptable tables using different algorithms (for example, multiplying by a constant). The example above only illustrates one technique that was employed and did operate successfully.

In practice, these 90 different acceleration (and deceleration) profiles each require about the same amount of time to reach constant velocity so a common unique emitter timing is used for start of scan. However, each profile requires a slightly different start position. This is handled by providing a delta x table in the microprocessor 100. The microprocessor 100 uses the BIAS UP or BIAS DOWN controls 425 to adjust the starting position before starting the scan process.

To summarize the operation of the control system, reference is made to FIG. 6. Prior to initiating the copying operation, the operator positions the indicators (91/93—see FIG. 5) to obtain the desired reduction. This may result in movement of the lens 9, and movement of the lens 9 is reflected by an output from the lens tachometer 21, which is monitored by the processor 100. The selected reduction mode is determined from the lens position, and this allows the microprocessor 100 to select a number of factors, the M offset factor, and the $\Delta$ or staging factor. The first is the quantity by which each entry in the stored M factor table is to be modified (if necessary), the second corresponds to a bias up or down movement of the scanning carriage to position the carriage in the proper starting position. When the operator initiates the copying sequence, the microprocessor 100 performs a number of functions: the scanning carriage position is moved in accordance with the $\Delta$ factor by using the bias up or bias down circuits 425 to produce an offset in the up/down counter 406. In addition, the first entry in the M factor table is accessed, offset by the proper amount and output on the data bus in two bytes in conjunction with the LOAD A and LOAD B signals to thereby load the latches 404a and 404b. The microprocessor 100 outputs the LOAD C signal to load the quantity from latches 404a and 404b to the latch 404c. A second table entry is accessed, adjusted and loaded into the latches 404a, b. The processor then monitors tachometer 22 (TK2) and just prior to an appropriate pulse from this tachometer, produces the START signal and removes various reset signals. This partially enables gate 416 and allows counter 414 to begin counting. When the pulse from drum tach 22 (TK2) is produced, latch 418 is set and when counter 414 reaches an appropriate condition, the latch 415 is set, fully enabling gate 416 and producing the ENABLE signal. This allows counter 417 to being counting and the servo loop has now been fully synchronized with the drum 22.

The ENABLE signal results in the production of output signals from gate 424 (FIG. 8a) to being counting counter 403. When that counter produces a "borrow" gate 422 is enabled to load the counter with the quantity in latch 404c. The counter 403 is now continually decremented to the production of a borrow and reloaded with the quantity in latch 404c, until the next interrupt, at which time, the quantity in latch 404c is changed, and the third factor in the M factor table, appropriately offset, is loaded in the latches 404a and 404b. As the "borrow" pulses are produced, counter 406 is up counted, and as the scanning carriage begins movement, the counter 406 is down counted. The servo loop maintains the scanning carriage on the appropriate acceleration profile, related to the selected reduction mode. As the scanning carriage is accelerated up to the desired constant velocity, the last M factor, appropriately offset, is repeated for each interrupt and thus the repetition rate of the signals COUNT remains fixed. After a fixed number of interrupts, the deceleration table is entered and the scanning carriage is decelerated to a stop.

The foregoing typically corresponds to a rescanning operation, i.e., movement away from HOME, and a similar operation is repeated for the scanning phase, i.e., movement toward HOME, during which image transfer takes place in the constant velocity phase of movement. The M factor table used is identical except that, of course, since motion is in the opposite direction, the SIGN bit is changed in polarity from rescan to scan.

By virtue of use of the Δ table, and the offset to the M factor table, the copier is capable of operating in any one of a large plurality (for example 90) different reduction modes, and producing controlled and repeatable position, velocity and profiles for accurate image transfer.

The enhanced repeatability of scanning carriage position, velocity and acceleration enables the FAST FLYBACK mode of operation which is different from the mode of operation described above, in that there is no resynchronization at the termination of rescan and prior to the the beginning of the scan in that the scanning carriage assembly is decelerated to virtually zero velocity and again re-accelerated in the opposite direction without losing synchronization.

Figure 15A:
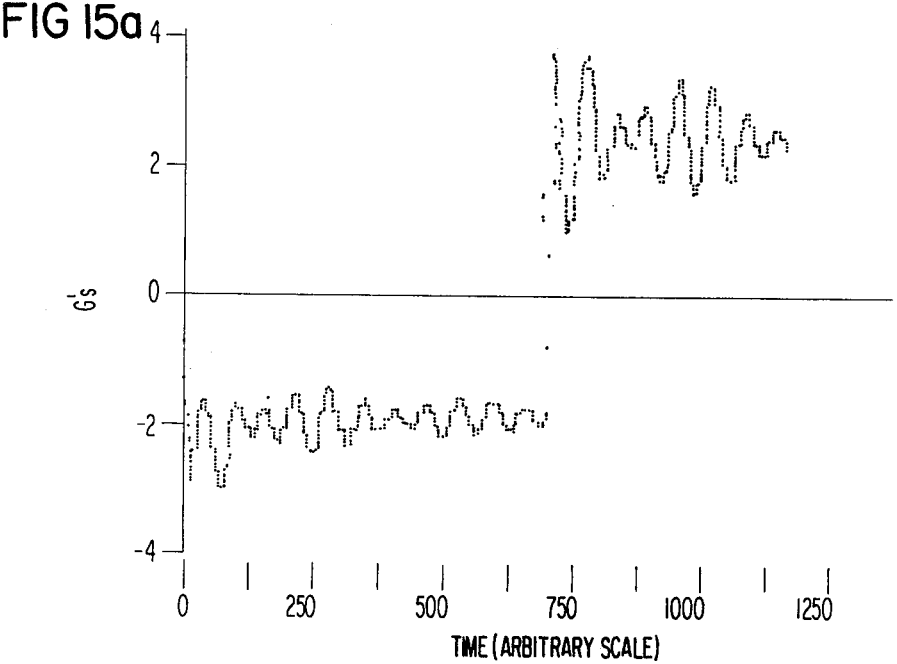
FIGS. 15a and 15b compare predicted response for the inventive and another control system.
Figure 15B:
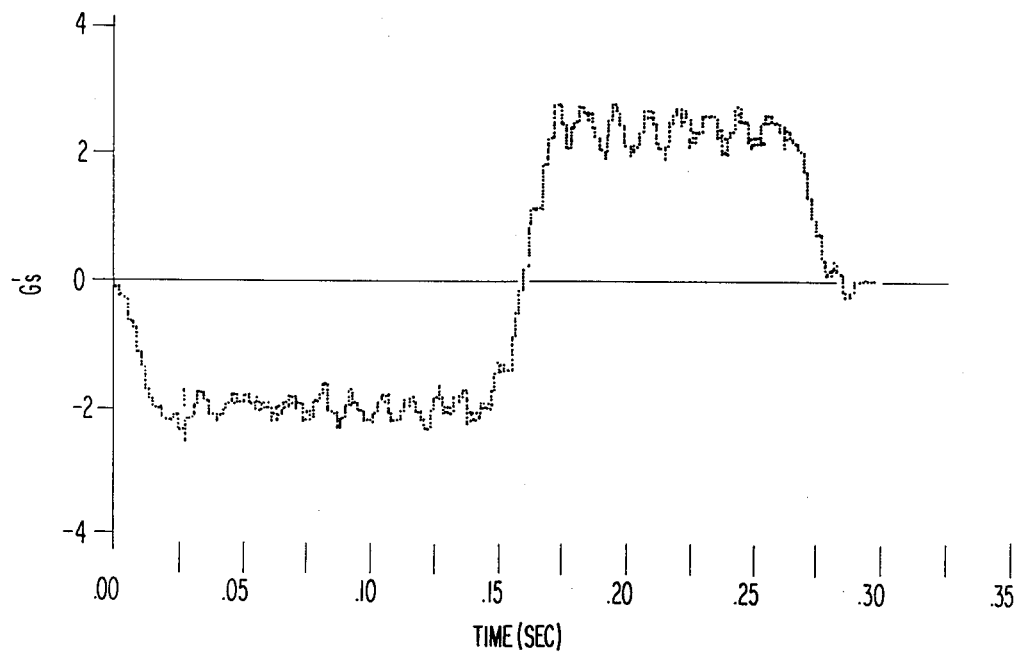

As has been mentioned previously, the ability to tailor the acceleration profile, in accordance with the present invention, provides a significant advantage in terms of reducing system resonance, as compared to other control systems in which a step change in acceleration is effected. To illustrate this reduction in system resonance, FIG. 15a illustrates acceleration of a scanning carriage which is subjected to a step change in acceleration whereas FIG. 15b illustrates the acceleration of a scanning carriage assembly which is subjected to a profiled acceleration change in accordance with the teaching of the present invention.

Figure 16B:
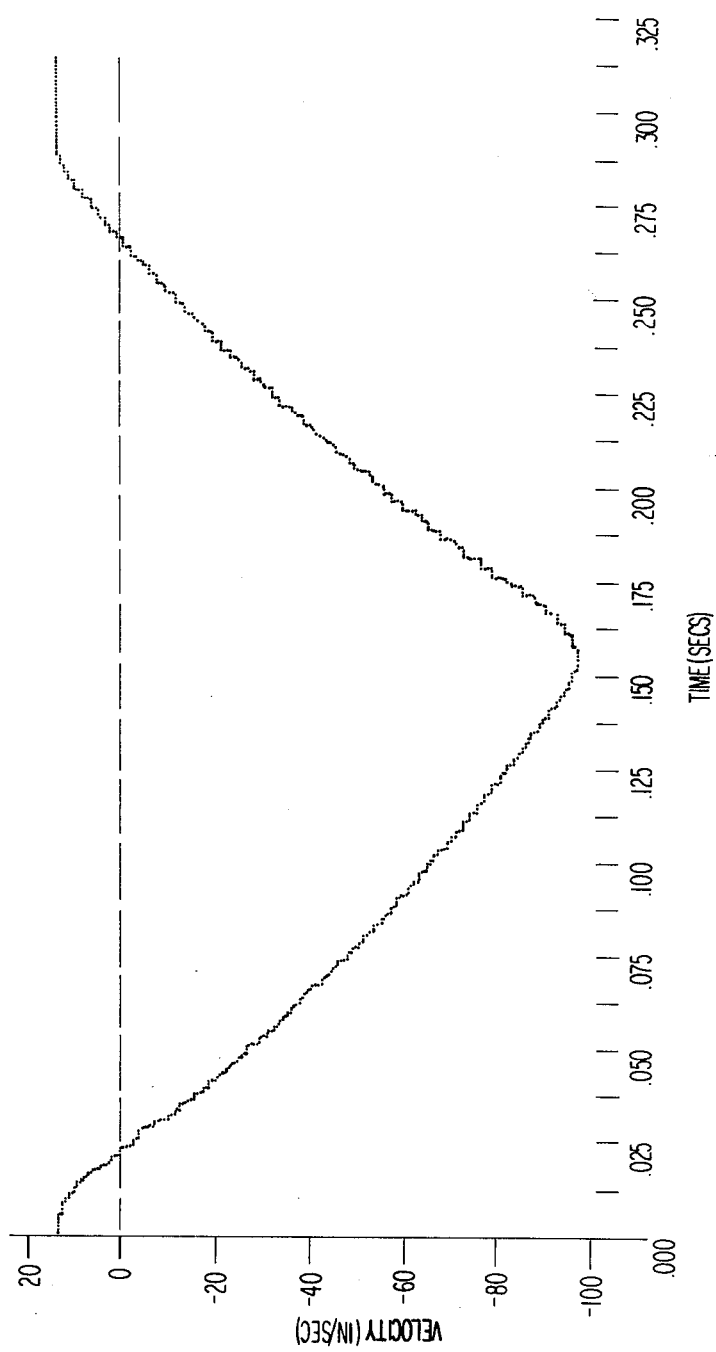

In a fast flyback mode of operation used in an embodiment which has been constructed only in 1:1 reduction, as the carriage terminates its scanning operation, it is decelerated to substantially zero velocity, re-accelerated in the opposite direction in what is termed a fast flyback mode in which the carriage achieves substantially higher velocities than those normally encounted in a scanning operation, decelerated from this relatively high velocity to substantially zero velocity, and accelerated back in the first-mentioned direction to a substantially constant velocity motion for a scanning operation, and in which the total time taken by this operation is less than 300 milliseconds. This allows the machine to copy on every cycle of drum rotation, even though the circumference of the drum may be only 15.5 inches and the image area may occupy 14 inches of that distance. FIGS. 16a through c illustrate, respectively, position, velocity and acceleration of the scanning carriage assembly as a function of time throughout the fast flyback operation. FIGS. 17a and b show velocity and acceleration of the scanning carriage assembly versus position throughout the fast flyback operation.

As shown in FIG. 16a, time measurement begins at the conclusion of a scanning operation; the scanning carriage assembly is decelerated to a stop and changes direction at about 35 milliseconds after the start of time measurement, and continues moving in a new direction, in a fast flyback mode of operation wherein it is accelerated to a relatively high velocity and then decelerated to change direction of motion at about 260 milliseconds after the beginning of time measurement.

FIG. 16b illustrates a velocity profile as a function of time. In the initial phase of the fast flyback mode of operation, the scanning carriage assembly is decelerated from a relatively constant velocity (about 13 inches per second), its velocity passes through zero and changes sense, it is accelerated to a relatively high velocity on the order of 100 inches per second, wherein it begins deceleration and again the velocity changes sense, and it is again accelerated to the same relatively constant velocity from which the fast flyback mode of operation was entered. FIG. 16b makes it clear that the scanning carriage assembly velocity passes through zero rapidly, i.e., it is stopped only "instantaneously". FIG. 17a illustrates the velocity profile as a function of distance. As shown, the scanning carriage assembly is travelling at a relatively constant velocity when it begins to decelerate between 12 and 12½ inches from a reference position. The velocity passes through zero very rapidly, and is increased in the opposite sense until it reaches about 100 inches per second at which point, the scanning carriage assembly begins deceleration phase of its movement, and the velocity passes through zero and increases in the opposite sense until the scanning carriage assembly is brought up to its desired relatively constant velocity.

FIGS. 16c and 17b illustrate acceleration of a scanning carriage assembly as a function of time and position. By comparing FIG. 16c and 17b it is apparent that the power amplifier current signal applied to the servo motor 70a (corresponding to the acceleration signal) is not turned off when the velocity goes to zero and the carriage direction changes. This mode of control is possible because of the accuracy achieved by this control scheme and is desirable because of the time and energy savings. It also is much more accurate because it eliminates the need to restart the operation resulting in an initial synchronizing error. In both FIGS. 16c and 17b, the fast flyback mode of operation is entered from a condition of zero acceleration, the acceleration is rapidly increased, it is apparent from FIG. 16c that the increase in acceleration is controlled, acceleration peaks and then begins decreasing, the acceleration passes through zero and increases in similar fashion in the other sense to a peak and then decreases to zero.

To implement the fast flyback mode of operation, the M factor table is determined in the manner previously set forth. However, in order to change direction, as is required in fast flyback, the control bit, which is of one kind for movement in one direction, is changed to the other kind to alter the direction of movement. Thus, for example, if the first factors X in the M factor table are to result in rescanning movement, each is associated with a corresponding control bit. The next M factor and succeeding M factors are associated with control bits of the other kind to result in scanning rather than rescanning movement.

To achieve the scan position and time repeatability accuracy required of the fast flyback mode of operation that allows one copy per cycle, the following additional criteria must also be met. First of all, the process should not be stopped and started between copies as this will result in a small offset error during synchronization. This error is small and acceptable in operating modes other than fast flyback as it only affects the initial placement of the image on the drum and subsequently the paper. Secondly, all the process control signals (such as INTERRUPT) must be exactly synchronized with the clock signals CL 1 and CL 2 so that their timing is exactly repeated from one drum revolution to the next. (This is why counter 417 was required. In the referenced application, the INTERRUPT signal is generated by means of a trigger with the drum tach signal as input. This would still probably be adequate if the fast flyback mode of operation were not required.)

Finally, the M factor table for fast flyback must be adjusted to prevent walking of the image from one rescan-scan cycle to the next. This effect can result from a mismatch between the number of count pulses used to increment counter 406 from the number of tach pulses used to decrement the counter 406 or a mismatch between the total number of CL 1 clock pulses emitted during a rescan-scan cycle from the number emitted during a complete drum revolution. This can be prevented by calculating the number of up and down counts to counter 406 during a rescan-scan cycle. Since the servo circuit can be described mathematically, the calculation while tedious, is possible and actually quite suited to computer calculation. Any difference can be eliminated by adjusting the M factors. Likewise, similar adjustments can be made to ensure that the total number of CL 1 clock pulses in the rescan-scan cycle are the same the number emitted during one drum rotation. In an embodiment that has been constructed, one drum revolution produced 680 drum tach pulses and the clock phase locked loop had a multiplying factor of 2048 (i.e., 2048 CL 1 pulses were produced for each drum tach pulse) for a total of 1,392,640 clock pulses per revolution.

An additional advantageous effect of acceleration profile shaping is particularly evident in the fast flyback mode. Note from FIG. 16c that not only is acceleration turned on and off slowly, but that it is also shaped so high acceleration occurs only at low velocity. Compare FIGS. 16b and c or FIGS. 17a and b. As velocity increases, the back EMF on the motor increases, resulting in less voltage available at the power amplifier. Thus, the acceleration profile is deliberately shaped to require less acceleration (and hence less current to the motor) when velocity is high. (During deceleration, friction and back EMF are aiding so the profile is reversed.) A significant cost and power saving is effected, i.e., the desired results are achieved with a smaller motor and power supply than otherwise would be required.

Others of the control bits, if used, can be used for various ancillary purposes. For example, one safety feature can be implemented by monitoring carriage velocity, either with a discrete circuit responsive to tach pulses, or with the processor by making it responsive to tach pulses. A maximum safe velocity is established, for example, 30"/sec., and a failure is signalled if carriage velocity exceeds this threshold, signalling a failure can also cause the carriage to stop, to prevent carriage crashes. In the fast flyback mode, however, velocities in excess of 30"/sec. are expected, i.e., up to about 100"/sec. in one embodiment. Another control bit (a FAST bit) can be set only in the fast flyback mode to inhibit the excess velocity test or responding to the results of such excess velocity measurement. In the preferred embodiment, the upper velocity limit is changed from about 30 in/sec. by this control bit. A further control bit can be set only when the carriage is to be stopped; it is this bit which enables the bias circuits to initialize carriage position preparatory to a scanning operation.

As has been made clear hereinbefore, to produce the desired motion from the scanning carriage, the control circuit 15 requires active cooperation of the microprocessor 100 to receive, at the proper points in the profile in the carriage, the appropriate control number (or M-factor). To effect this, the microprocessor 100 stores a plurality of tables which are accessed at various times; these tables include the following:

single acceleration table which is used in both scanning and rescanning motion;
a similar deceleration table which is used in both scanning and rescanning motion;
a fast flyback table which is a single table which is made up of four portions; accessed in order, these portions include a scan decelerate portion, a rescan accelerate portion, a rescan deceleration portion and finally, a scan accelerate portion;
a reduction offset table which includes a different entry for each desired reduction factor; in an embodiment which has been constructed, the machine is capable of operating with 90 different reduction modes and therefore the table includes 90 entries, although at least one and perhaps some of the entries requires zero offset;
a staging table which has an entry for each different reduction mode designating the desired initial position of the carriage;
and finally,
a constant velocity count table which includes a different constant velocity count for each different paper length with which the machine is to be used.

Each entry in the acceleration-deceleration and fast flyback tables includes a plurality of control bits, at least one of which is a so-called stop lock bit, which is used to designate to the servo that the carriage is to be stopped, either at the front or the back of the machine. However, only the deceleration table includes an M-factor with the stop lock bit set. Additional control bits may be included for error control purposes such as a particular bit indicating that the carriage should be in a predetermined position when the bit is recognized, or a fast bit to indicate that the machine is in a fast flyback mode, and therefore the normal velocity speed limit is not to be enforced.

In the embodiment which has been constructed, fast flyback mode is used only for a single paper size and then only in a 1:1 reduction and therefore, when the selected paper size is active and reduction is 1:1, a fast flag bit is set to indicate, in the event that multiple copies are to be made, that the fast flyback mode can be entered. Likewise, in the embodiment which has been constructed, the machine is capable of reduction only when a selected paper size is to be used. Of course, with appropriate modifications, the invention is not limited to these constraints. In addition, when the machine is in a 1:1 reducing mode, multiple paper lengths can be employed.

As has been disclosed above, this requires altering the carriage profile and the staging table is used for this purpose as well. Accordingly, the stage table includes an entry for each different paper length that can be active when the machine is in a 1:1 reducing mode.

Inasmuch as the microprocessor 100 has functions which are not directly tied to operating the control circuit described herein, the microprocessor software to be disclosed hereinafter is that which is directly applicable to operation of the control circuit. In addition, the microprocessor includes a number of standard housekeeping routines which will not be disclosed in detail.

FIGS. 18a-f illustrate the control circuit related software modules. Before describing these in detail, it is worthwhile to mention that one of the undisclosed modules tracks the output of the lens tachometer 21 and maintains a register with a running count corresponding to the position of the lens.

Figure 18A:
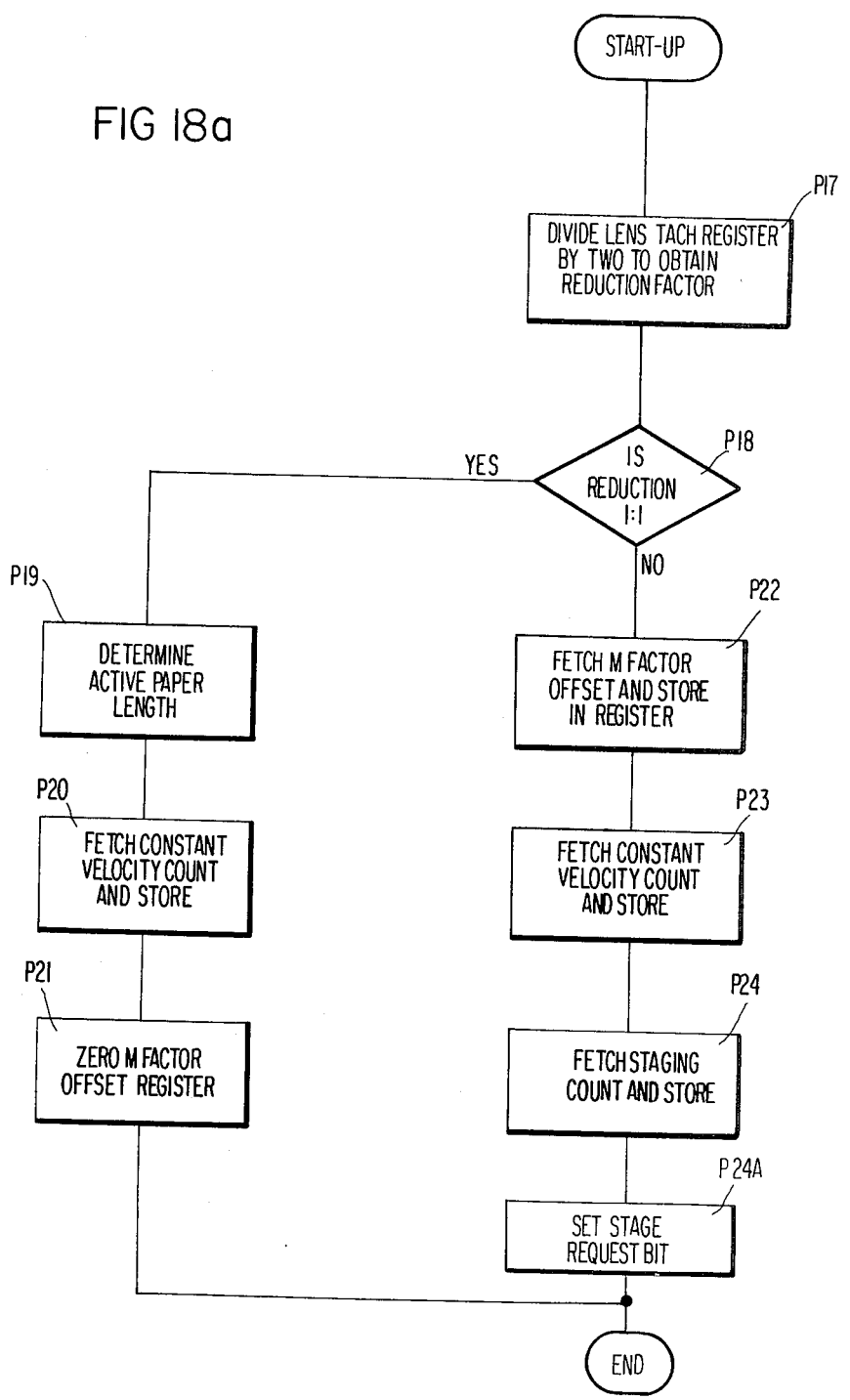

With that in mind, reference is now made to FIG. 18a which illustrates a start-up module, which is called by a master or executive module when the operator depresses the start button, indicating that copy is to commence. A first function of the start-up module shown in FIG. 18a, function P17, divides the contents of the lens tachometer register by a predetermined count, for example 2, to obtain the reduction factor. The reduction factor is a ratio between object size and the desired copy size and is used in accessing the variety of tables. With the reduction mode computed, function P18 determines if the reduction is 1:1, i.e., full size. If the reduction is to be full size, then function P19 determines the active paper length, i.e., which paper length has been selected by the operator. As has been mentioned, the embodiment of the invention which has been constructed employs reduction only in a selected paper size, and therefore this function need not be performed if the reduction is anything but 1:1. With the active paper length, function P20 fetches from the table the constant velocity count and stores the same in the appropriate register. This count will be used in other modules to be disclosed hereinafter. Finally, function P21 zeroes the M-factor offset register since, with reduction in the 1:1 mode, no offset is required.

In the event that reduction is not 1:1, then function P22 fetches the M-factor offset from the tables and stores it in the appropriate register. Function P23 fetches the constant velocity count, and also stores it in an appropriate register. Function P24 fetches the staging count and stores the same in an appropriate register. Finally, function P24a sets the stage request bit. Each of the tables accessed in functions P22-P24 are accessed based on the reduction mode which had been computed in function P17.

Figure 18B:
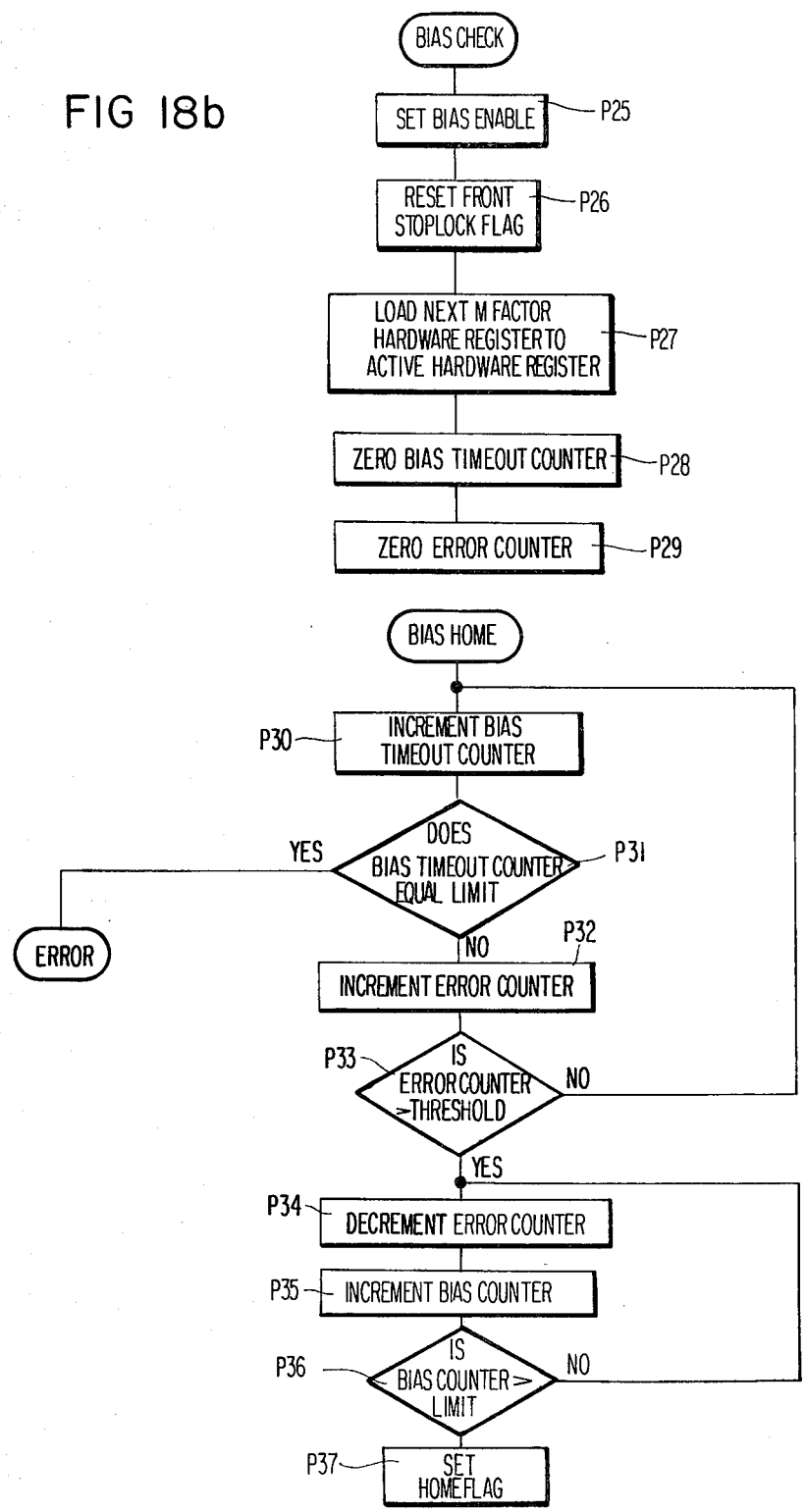

FIG. 18b illustrates the bias check and bias home modules; bias check may be called by the master or executive module on a timed basis in the event that the carriage is not involved in a scanning or rescanning operation; and the bias home module, also illustrated in FIG. 18b, is called at the conclusion of the bias check module.

As shown in FIG. 18b, function P25 sets the bias enable which is a software flag, function P26 resets the front stop lock flag which is a software control bit. Function P27 loads the next M-factor hardware register to the active hardware register. The next M-factor hardware register corresponds to the latches 404a and b and the active hardware register corresponds to latch 404c. This function results in the signal LOAD C. Functions P28 and P29 zero respectively the bias time out counter and the error counter. The bias time out counter is a counter internal to the microprocessor, whereas the error counter is the up/down counter 406 (see FIG. 6).

With the bias enable flag set and the bias time out counter zeroed, the bias home routine is entered. Functions P30-33 comprise a loop which can be exited under one of two conditions; each time the loop is traversed, the bias time out counter is incremented and that counter is compared by function P31 with a limit. If the limit is exceeded, the loop is exited at P31 and an error message is enabled indicating a failure to home the carriage. Assuming that the bias time out counter is less than the limit, function P32 increments the error counter (this is up/down counter 406) and function P33 compares the error counter contents with a threshold. If the threshold is not reached, the loop is maintained; if the threshold is reached, the loop is exited at this point. Since the error counter is in the servo loop itself, counts in the error counter may result in motion of the servo motor 70a and resulting motion of the carriage. Incrementing the counter which is the function performed in the loop P30-33 moves the carriage toward the front of the machine, and more particularly, a resilient bumper. If, in response to incrementing the counter 406, motion of the carriage results, the counter is decremented by the servo loop itself. If the decrementing action does not occur, the logic of this module assume its is because the carriage is abutting the bumper and when a predetermined count is reached in the counter 406, loop P30-33 is exited. The concluding portion of this module functions P34-36 decrement the error counter a predetermined quantity per traversal of the loop, and the number of times the loop is traversed is counted in a bias counter via function P35. When the bias counter reaches a predetermined count, the loop is exited and function P37 sets the home flag indicating the carriage is now in its home position.

Figure 18C:
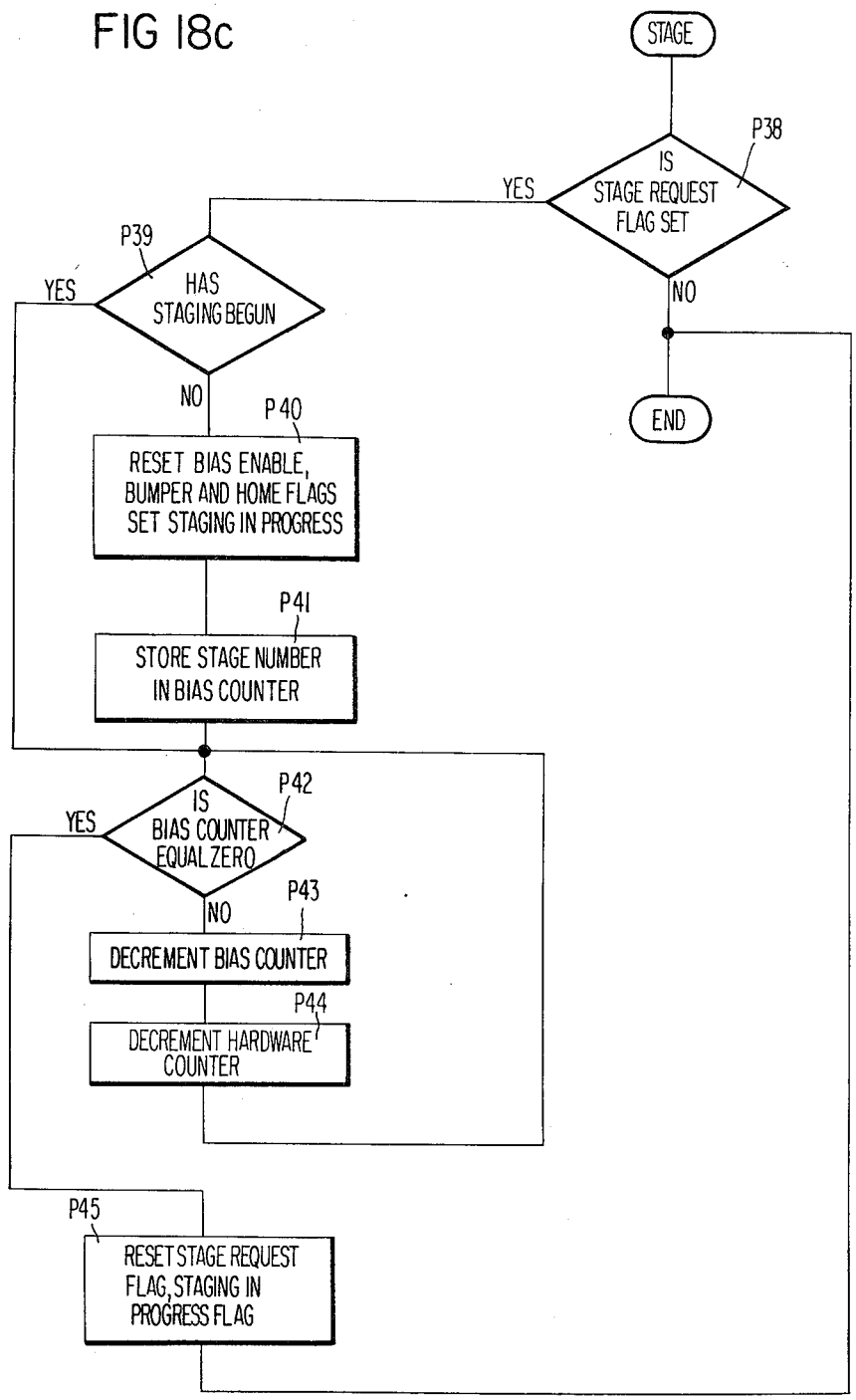

The staging module, illustrated in FIG. 18c, works with the entry in the staging table extracted from the startup module at function P24. As shown in FIG. 18c, if the stage request flag is set, i.e., this is the bit set by function P24a (see FIG. 18a), function P39 determines if staging has begun by referring to a staging in progress flag. Assuming staging has not begun, function P40 resets the bias enable, bumper and home flags and sets the staging in progress flag, and function P41 stores the stage number in the bias counter. This module includes a loop at functions P42 through P44 in which the hardware counter 406 is decremented a predetermined number of counts for each traversal of the loop and the number of times the loop is traversed is maintained in a bias counter which is originally set at function P41 with the staging number extracted from the table. When the bias counter equals zero, i.e., the loop has been traversed for the desired number of loops, then the module exits from the loop and function P45 resets the stage request flag and the staging in progress flag. As a result of this module, the hardware counter 406 is decremented a predetermined number of times in accordance with the staging number extracted from the table which may result in motion of the carriage to an initialized starting point, initialized for the selected reduction mode, in the event that reduction has been selected or initialized for the selected paper length, in the event that reduction has not been selected.

Figure 18D:
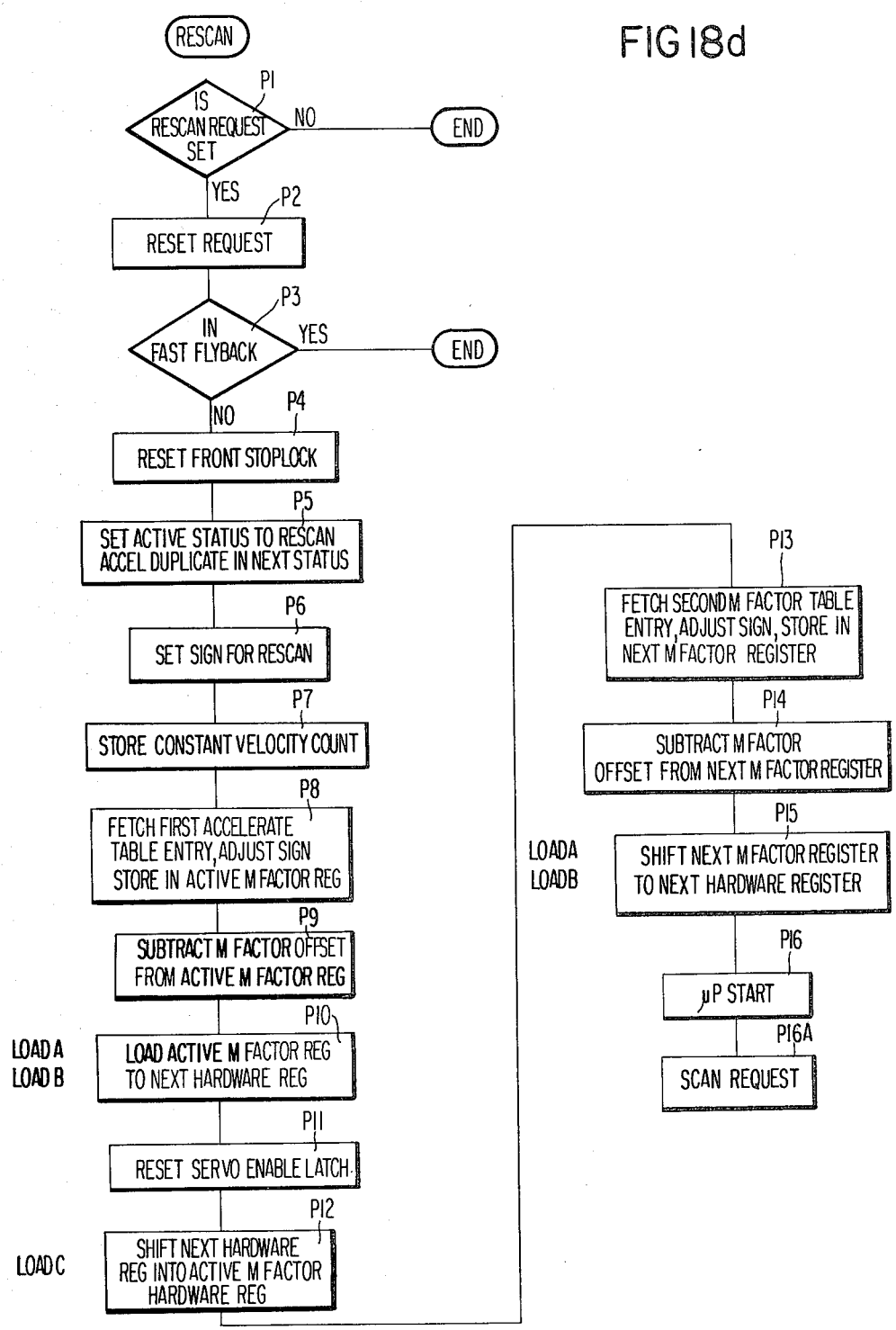

FIGS. 18d and e illustrate the rescan and scan module respectively. These modules initialize the servo loop and the processor 100 and actually terminate when the servo loop is enabled. Thereafter, a further module, a servo interrupt module, is called on an interrupt driven basis to perform the remaining functions required of the processor to maintain the servo loop in the desired operating mode. Basically, the rescan and scan modules derive from the appropriate table the first two entries; on each different succeeding interrupt, a servo interrupt module derives another entry from the appropriate table.

Referring now to FIG. 18d, the rescan module is called by the executive or master module based on a particular orientation of the drum, and each module may be called on only once per drum revolution.

Referring to FIG. 18d, the first function, P1, determines if the rescan request has been set. If not, the module terminates. The rescan request is set, either in response to operator actuation of a START button, or may be set at the conclusion of a prior scan operation. If the rescan request had been set, function P2 resets the request and function P3 determines if the fast flyback mode is operating. As will be seen hereinafter, in a discussion of the servo interrupt, fast flyback is set at the termination of the constant velocity portion of the scan motion, on a first rescan-scan cycle and if set the fast flyback mode is used for all motion except the constant velocity scanning. Therefore, the rescanning module is only employed on the first rescan of those copying cycles in which fast flyback is available. Assuming that fast flyback is not enabled, then function P4 resets a front stop lock bit, the use of which will become clear hereinafter. Suffice it to say that the bit is in a sofware register. The front stop lock bit, when set, and existing in the active M-factor hardware register, i.e., latch 404c, prevents the servo interrupt, rescan or scan modules from causing motion of the carriage, and only when that bit is set can bias home or staging take place. Function P5 sets the active status to rescan accelerate and duplicates that status in a next status byte, the use of which will become clear hereinafter. At this point, it is enough to say that these bytes exist within the microprocessor. Function P6 sets the sign for rescan. As has been mentioned, the direction of the carriage motion is determined by a control bit, and that is the sign bit which is set to one or another condition depending upon whether rescan or scan motion is desired. Function P7 stores the constant velocity count, derived in the start up module in an appropriate register where it will be accessed during the servo interrupt module. Function P8 fetches the first entry in the accelerate table, adjusts the sign, and stores it in a software register identified as the active M-factor register. Function P9 subtracts the M-factor offset, determined in the start-up module, from the contents of the active M-factor register and places the result back in the active M-factor register. As has been mentioned, although only a single accelerate and decelerate table is stored, different tables are created from that base by subtracting different offsets from each entry, and function P9 results in the subtraction of the offset from the first table entry. Function P10 loads the active M-factor register, i.e., a software register, to the next hardware register; this function generates the LOAD A and LOAD B signals for loading latch 404a and b with the two bytes from the active M-factor register. Function P11 resets the servo enable latch and function P12 shifts the next hardware register into the active M-factor hardware register. This function generates the signal LOAD C and forces the transfer of the contents of latches 404a and b into latch 404c. Functions P13 through P15 cause a second entry in the accelerate table to be accessed, adjusted in sign and the M-factor offset subtracted therefrom, and the result stored in the latches 404a and b. Function P16 results in the START signal, the use of which is illustrated in FIGS. 6 and 7 and function P17a sets the scan request flag.

Figure 18E:
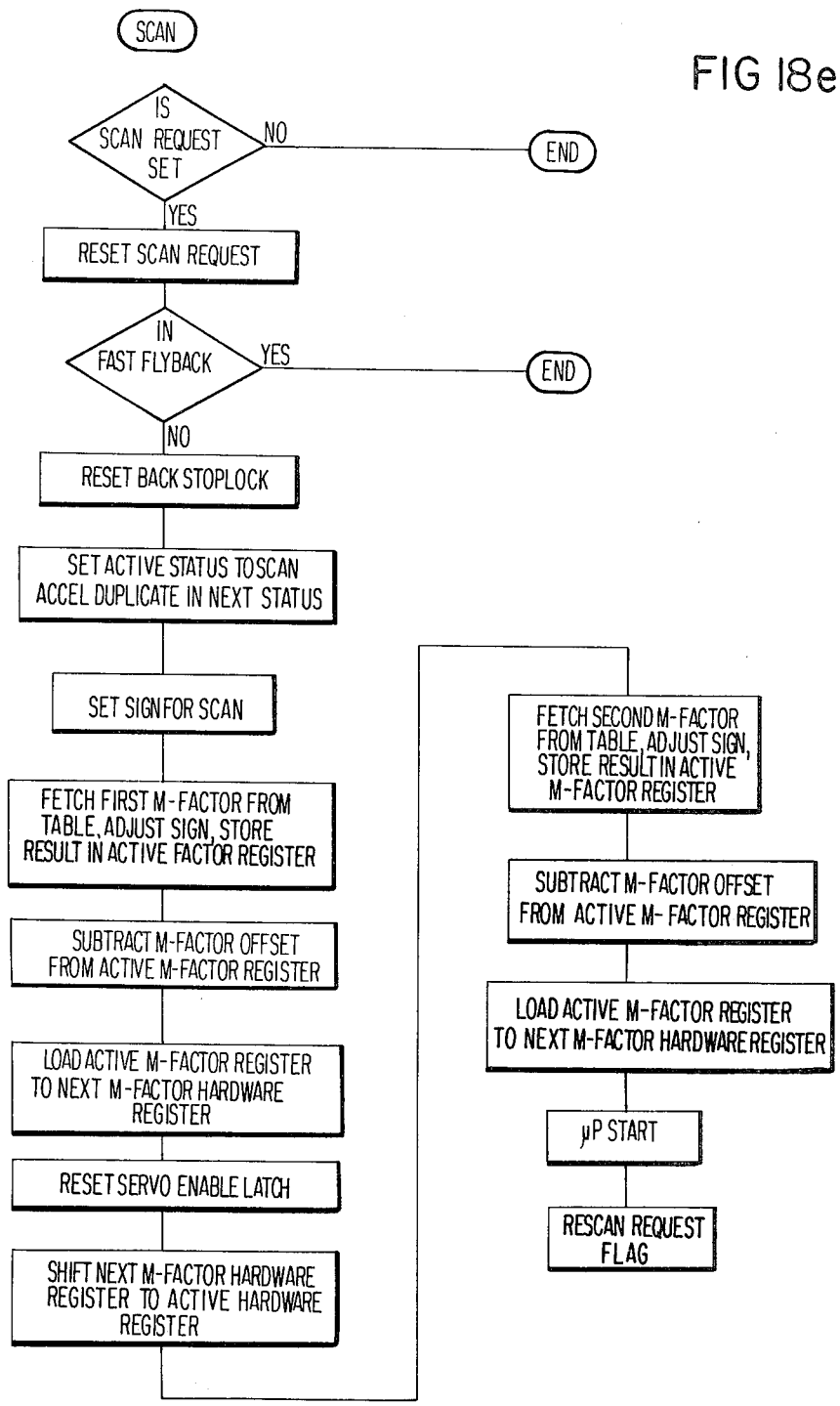

FIG. 18e illustrates the scan module which, in many respects, is similar to the rescan module except, of course, scan is called at a different position of the drum. In addition, the scan module does not include a function corresponding to function P7 since once that function is accomplished during the rescan module, the constant velocity count is available throughout the remainder of the following rescan-scan cycles initially set up via the operator request. Since the rescan and scan modules are otherwise similar, no further discussion of the scan module is believed necessary.

Finally, FIG. 18e illustrates the servo interrupt module. The servo interrupt module is divided into four sections depending upon the active status, following the first function which is to update the active status byte from the next status byte, function P15. The various portions of the servo interrupt module will be discussed in the order in which they would be executed during normal operation. Accordingly, function P51 does not find the active status in a fast flyback mode, at least initially; function P52 finds the active status as normal accelerate, since that is what the rescan module sets the active status to be, see FIG. 18d. Function P75 therefore increments the servo pointer register. The servo pointer register is a register containing the address of the next location in the table being acccessed, and in the rescan module, the pointer register becomes set at function P5 when the active status is set to rescan accelerate. Function P8 also increments this register so that when function P75 is executed on the first interrupt, it is incremented to point to the third entry in the table. Function P76 determines if this is a constant velocity code. The conclusion of the accelerate table is an entry which is decoded at function P76 to call for constant velocity as the next status. On the first traversal of the interrupt module, such a constant velocity decode is not encountered, the module executes function P77 through P79. This has the effect of accessing the third table entry, subtracting the offset and loading it in the latch 404a and b. The preceding functions are performed for each succeeding interrupt until a constant velocity decode is detected at function P76.

Upon the decoding of a constant velocity byte, functions P83 through P85 are performed to shift the next status byte to constant velocity, set a counter termed the constant velocity counter, to a count of one, and to increment the servo pointer register. As has been mentioned above, rather than employing a table entry for each constant velocity interrupt, a single entry is employed and is located after the constant velocity decode byte. This entry is accessed by incrementing the pointer register at function P85. As has also been mentioned, this M-factor will be used for a predetermined number of interrupts and the coupler originally set to a count of one by function P85 will keep track of this number of interrupts. Therefore, following function P85 functions P77 through P79 are again performed. Since, at this time, the servo pointer register is pointing at the constant velocity M-factor, that is the factor extracted at function P77.

The next time an interrupt occurs, function P52 will determine that the active status is now constant velocity and therefore function P53 will direct the module to perform function P57. In function P57, the constant velocity counter is compared to the limit which had been extracted in the start-up module. Assuming the counter is not at the limit, function P58 is performed to increment to constant velocity count, and the M-factor which has been stored in the M-factor register at function P77 of the previous interrupt is again output at function P79 to the next M-factor hardware register (latches 404a and b). These functions are performed on each succeeding interrupt until the constant velocity counter equals the limit at function P57 and the module is directed to function P59. P59 determines if this is a scan. Since the rescan module had set the status to rescan, the module will be directed to function P65. At function P65, two tests are made, i.e., the status of the fast flag and the active status. Assuming that the appropriate paper length is chosen and reduction is 1:1, the fast flag is on. However, the status is not scan constant velocity since our example is operating in a rescan mode. Accordingly, the module is directed to functions P62 and 63. At these functions, the next status is shifted to decelerate and the normal decelerate address is stored in the pointer register. Following the function P63, functions P77 through P79 are performed to fetch the appropriate M-factor for output after appropriate adjustment. On the succeeding interrupts, functions P51 through P53 direct the module to function P54 where it is determined that the active status is decelerate. Accordingly, functions P69 and 70 are preformed to firstly increment the servo table pointer to access the next table entry. Function P70 provides a test to check the stop lock bit. Only the last entry in the decelerate table has the stop lock bit set, and therefore, on the first decelerate servo interrupt, functions P77 through P79 are performed. Succeeding interrupts perform like functions until function P70 determines that the stop lock bit is set. Function P71 will determine if the next status is front stop lock, and since the rescan motion is from front to back of the machine, that is not the case. Function P73 determines if the rehome flag is set. Typically, it is not set, and therefore, function P74 is performed to reset a fast sync flag, if any had been set. Thereafter functions P77 through P79 are performed. When function P79 is performed, the M-factor with the set stop lock bit is loaded into latches 404a and b. On the next succeeding interrupt, when the contents of that latch are transferred to latch 404c, the carriage becomes stop locked. Thereafter, the scan module is called, based on drum position. Calling of the scan module results in performing functions similar to those performed during the rescan module performance, i.e., the servo loop is initialized and the carriage begins its scanning motion based upon the accelerate table. The first interrupt following operation of the scan module results in function P52 determining that the status is normal accelerate resulting in performance of functions P75 and following; this is previously discussed in connection with the rescan acceleration. Following the appropriate number of interrupts, the active status becomes constant velocity, and the associated constant velocity functions, also previously discussed, are performed. On the interrupt, which finds the constant velocity counter equal to the limit, function P59 is again performed, however, since this is a scan, function P60 is performed to set the document feed. This has the effect of initiating the feed of a copy document to receive the image which has now been placed on the drum during the constant velocity portion of the scan motion. Function P64 determines if the last scan is set. i.e., is this last scan to produce the required number of copies. If it is, function P61 is performed to reset the last scan flag and then the functions P62 and P63 are performed to carry out the scan deceleration. Succeeding interrupts bring carriage to a stop at the front stop lock position. In this process, functions P69, P70, P71 and P72 are performed. The carriage settling delay initiated at P72, when terminated, results in calling the bias home module to insure that the carriage is in the proper position for succeeding operations.

However, in the event that function P64 determines that this is not the last scan, i.e., the last scan flag is not set, then function P65 makes two tests—is the fast flag on, and is the status scan constant velocity? In the example under discussion, both tests are met, and therefore, functions P66 through P68 are performed. These functions set the next status byte to fast flyback, store the fast flyback address in the pointer register, set the fast sync flag and fetch the next M-factor from the fast flyback table and store it in the next M-factor register. Following function P68, function P79 is performed. Note that in contrast to previous interrupt processing, no sign adjustment is effected and no subtraction is effected. This is for the reason that the fast flyback table includes distinct portions to handle both scan decelerate, rescan accelerate, rescan decelerate and scan accelerate. Accordingly, no sign adjustment is necessary. Furthermore, since fast flyback is a trajectory for only 1:1 reduction mode, no offset is required.

Upon succeeding interrupts, function P51 finds the active status to be fast flyback, and therefore, functions P55 and P86 are performed. P55 increments the pointer, and P86 determines if this is a constant velocity code. Assuming it is not, function P56 and P79 are performed to output the next fast flyback M-factor. When a constant velocity decode is detected at P86, function P87 shifts the next status to constant velocity, function P88 sets the constant velocity counter to one, and function P89 sets the constant velocity limit to the fast flyback count. This sets up constant velocity scanning in a fast flyback mode. Function P90 again increments the servo table poiner so as to point to the actual constant velocity M-factor, and functions P56 and P79 output the factor to the hardware. Upon succeeding interrupts functions P53, P57 are performed. Assuming the constant velocity count does not equal the limit count, functions P58 and P79 are performed to continue outputting the same constant velocity M-factor. When the constant velocity count does equal the limit, function P59 is performed. Since in our example this is a scan operation, functions P65 through P68 are again repeated. In this fashion, the carriage continuously scans and rescans until the last scan flag is set when the deceleration is controlled by functions P62 and P63 to enter the deceleration active status. Once that status is entered, functions P54, P69, P70, et seq. are begun.

In the event that a reduction mode has been selected, then when the constant velocity limit is reached, function 57 in a scan, function P65 does not find the fast flag on since that is only on for 1:1 reduction modes. Accordingly, the next status is set to decelerate and functions P54, P69 and P70 bring the carriage down to a stop lock condition at the front of the machine and then the rescan module again causes rescan acceleration to be performed.

In the event that a failure, such as a paper jam or the like, causes the drum to cease turning, and the carriage is at the back of the machine, the servo interrupt routine includes functions P73, P80 through P82 to accelerate the carriage back to its home position. This is necessary since, assuming the drum is stopped, the scan module is not called. In addition, at the same time, the input to the clock 401 (see FIG. 6) is switched from the drum tachometer 22 to an internal oscillator so that the interrupt signals are continually produced at a desired rate until such time as the carriage is brought to the front stop position.

While this invention has been described with reference to a scanning optical system, it is equally applicable to a moving document system where the servo motor would drive the document support across stationary optics. It is also applicable to scanning lens systems where the servo motor would drive the scanning carriage which carries the lens. Obviously, multiple focus lens could be used in place of a single focus lens. The invention is not limited to continuously variable systems; it can be used with single speed scanning apparatus or with apparatus with a few discrete speed settings. Importantly, the invention can be applied outside the field of electrophotographic copier machines to facsimile machines or wherever scanning mechanisms are used. For example, it could be used to accurately control the acceleration of a sheet of paper that is to be attached to a rotating drum. As another example, it could be used to control the position of a print head of a facsimile printing machine where the print head is moved along the drum axial direction in synchronism with a rotating drum. In still another potential application, the scanning system may be used in conjunction with a digital encoding means such as a phototransistor array and where the digital encoding means is placed at the image plane or where the digital encoding means is moved as an integral part of the translation system. In most applications, the desired function such as document scanning, occurs when the relative motions to be synchronized are moving at constant velocities. However, this servo control system is capable of synchronizing the relative motion of two moving objects where one or both objects are moving at velocities that are not constant and/or have nonlinear velocity profiles. Essentially, the invention can be applied wherever servo systems are required to possess accurate acceleration and velocity profiles in order to obtain highly accurate position repeatability. Such modifications and uses are well within the skill of the art and fall within the scope of the invention.

What is claimed is:

1. A translation system to produce a controlled and repeatable position and velocity profile of a controlled object with respect to an independent parameter including a single control loop with driving means including a servo motor coupled to and driving said controlled object, tachometer means (23) responsive to driving means movement for producing an output signal representative of direction of driving means movement and including a series of tachometer pulses, each pulse representing a given increment of driving means movement, an up/down counter (406), coupling means (407, 408, 410) coupling said up/down counter to said driving means for driving said servo motor with a level representative of the contents of said up/down counter, driving signal source means (401, 402, 403, 404, 100) for producing a driving signal pulse train, each pulse representing a desired increment of driving means movement and a direction signal representative of desired direction of driving means movement, logic means (405) coupling said output signal, said driving signal pulse train and said direction signal to said up/down counter for stepping said up/down counter in one direction for each driving signal pulse and for stepping said up/down counter in another or one direction respectively, for each tachometer pulse which represents a direction which is the same or different from the direction of said direction signal, respectively, said driving signal source means including, counter means (403) including a counter for producing a driving signal pulse each time a predetermined count is attained in said counter, modulus means (404, 100) coupled to said counter for altering the modulus of said counter, said modulus means including storage means for storing representations of a plurality of quantities and means for presenting a predetermined sequence of quantities to said counter means, and means (401) for stepping said counter in accordance with said independent parameter.

2. The apparatus of claim 1 wherein said modulus means comprises:

latch means (404c) for presetting said counter in response production of each said driving signal pulse, latch loading means (423) for loading said latch means in response to a load signal, load signal generator (414, 417) for generating said load signal and said storage means (100, 404a, 404b) coupled to said latch loading means and emitting signals representing said plurality of quantities in sequence in response to a sequence of load signals from said load signal generator.

3. The apparatus of claim 2 wherein said load signal generator is operated in synchronism with said independent parameter for generating said load signal.

4. The apparatus of claim 3 wherein said storage means includes:

microprocessor means (100) and associated memory means with a predetermined access time, said microprocessor means responsive to said load signal to initiate an interrupt sequence to emit signals representing a one of said predetermined quantities within said access time following said load signal, whereby said microprocessor operates asynchronously with respect to said independent parameter.

5. The apparatus of claim 2 wherein said driving signal pulse is produced each time said counter underflows, and said latch means, responsive to said driving signal pulse, presets said counter to a count corresponding to a quantity stored in said latch means.

6. The apparatus of claim 2 which further includes a power source, a motor (10) driven by said power source, second tachometer means (22) generating a motor tachometer signal representing motor velocity, clock means (401) responsive to said motor tachometer signal for generating at least one clocking signal at a rate directly related to said motor tachometer signal, said at least one clocking signal driving said load signal generator and said counter.

7. The apparatus of claim 1 wherein said coupling means includes a digital to analog converter (407), a filter and compensation network (408) coupled to said digital to analog converter and amplifying means (410) coupled between said filter and compensation network and said servo motor.

8. The apparatus of claim 1 wherein said driving signal source means also includes:
control latch means (404b) for storing at least one control bit, one of said at least one control bit corresponding to said direction signal,
said storage means providing at least one representation of said at least one control bit to said control latch means, and wherein
said logic means, responsive to said control latch means, determining whether said driving signal pulse train counts said up/down counter in one direction or another.

9. The apparatus of claim 2 which futher includes clock means (401) for driving said counter, said clock means including
phase locked loop means (411, 412, 413, 414) including a second counter (414) responsive to said independent parameter for producing a clock signal to drive said counter, and
said load signal generator including
a third counter (417) responsive to said second counter for producing said load signal, and
gate means (416) for enabling said third counter when, and only when, said second counter is in a predetermined state.

10. A scanning electrostatic copying machine for copying at substantially any reduction ratio with a range of reduction ratios with repeatable position and velocity profiles for a scanning carriage, said machine comprising:
a motor (10),
image carrier means (13) driven by said motor for recording a latent optical image thereon,
a transparent document support (50),
a lens (9),
reduction means (18) for positioning said lens at a position corresponding to a selected reduction ratio within said range,
scanning carriage means (12) for directing an image beam from said document support to said image carrier,
servo motor means (15, 70a, 410) responsive to said reduction means and to said motor for driving said scanning carriage means for movement uniquely selected in accordance with said selected reduction ratio, said servo motor means including
a servo motor (70a) in a single control loop for controlling said servo motor to provide for repeatable position and velocity profiles of said scanning carriage, said servo motor means including an up/down counter (406) for driving said servo motor with a level representative of the contents of said counter,
counter means (401, 403) producing a pulse train at variable repetition rates synchronized to said motor for driving said up/down counter, and
storage means (404, 100) coupled to said counter means for storing quantities representative of various repetition rates at which said pulse train is produced and for controlling said counter means to produce a pulse train with repetition rates selected in response to said reduction means.

11. The apparatus of claim 10 in which said counter means comprises:
clock means (401) for producing at least one clocking signal of repetition rate directly related to velocity of said image carrier means,
a counter (403) clocked by a clocking signal from said clock means,
modulus means (404c) coupled to said counter for altering the modulus of said counter in sequence dependent on a sequence of quantities,
said storage means (100, 404a, 404b) including means for delivering a sequence of signals to said modulus means representing said sequence of quantities,
and signal means (417) coupled to said storage means for producing a sequence of signals at a rate related to velocity of said image carrier means,
each of said signals stimulating said storage means for delivering modulus signals representing a one of said quantities.

12. The apparatus of claim 11 in which said storage means includes a microprocessor (100) and associated memory and in which each said signal coupled to said microprocessor initiates an interrupt sequence of operations to produce said modulus signals.

13. The apparatus of claim 11 in which said modulus means comprises:
latch means (404c) for presetting said counter in response to each pulse of said pulse train, and
latch loading means (402) for loading said latch means in response to each of said signals, said latch loading means coupling modulus signals from said storage means to said latch means.

14. The apparatus of claim 13 in which said latch means presets said counter to a count representative of a quantity stored in said latch means.

15. The apparatus of claim 11 in which said clock means includes:
a phase locked loop (411, 412, 413, 414) including a second counter (414) responsive to motor velocity and coupled to said counter means,
and wherein said signal means includes a third counter (417) responsive to said second counter and gate means (416) for enabling said third counter, said gate means enabling said third counter when, and only when, said second counter is in a predetermined state and image carrier means is in a predetermined orientation.

16. An electrophotographic copying machine including an image carrying drum for producing an image on said drum on each rotation of said drum including:
a document support (50),
a lens (9),
scanning carriage means (12) carrying a source of illumination and reflectors for directing an image from said document support to said drum, and
servo motor means (70a, 15) for driving said scanning carriage means in a rescan-scan cyclical movement back and forth across said document support once per drum revolution, said scanning carriage directing an image beam to said drum at least during a portion of a scan movement, said servo motor means including,
a servo motor (70a),
an up/down counter (406) with an output,
means (407, 408, 410) coupling said up/down counter output to said servo motor for driving said servo motor with a level representative of up/down counter output, feedback tachometer means (23) responsive to servo motor movement for up or down counting said up/down counter, and driving pulse source means (401, 402, 403) for up or down counting said up/down counter, said driving pulse source means including, counter means (403) clocked at a rate related to drum velocity and producing an output for up or down counting said up/down counter each time said counter means reaches a predetermined count, modulus means (402, 404) coupled to said counter for altering a modulus of said counter and storage means (100) for sequentially presenting signals to said modulus means, in a temporal sequence related to motion of said scanning carriage means, so that said scanning carriage means at the conclusion of said portion of a scan movement, is decelerated from scanning velocity, reversed in direction, accelerated, decelerated and again reversed in direction and brought up to scanning velocity at a time between conclusion of a first image transfer and initiation of a second image transfer, with substantially less than a complete revolution of said drum taking place from deceleration from scanning velocity to attainment of scanning velocity.

17. The apparatus of claim 16 which further includes a clock (401) driven at a rate related to drum velocity for clocking said counter means and wherein said modulus means comprises a latch (404c), means for loading said latch (402) with signals from said storage means in response to a drum synchronized signal from said clocking means, and counter reset means (422) for resetting said counter means with signals from said latch each time said predetermined count is attained.

18. The apparatus of claim 17 wherein said storage means comprises:

memory means (100) storing a plurality of signals and stimulating means for stimulating said memory means to read out a succession of said signals in response to a succession of drum synchronized signals from said clocking means, and wherein said means for loading said latch includes a second latch (404a, 404b) coupled to said memory means and responsive to each of said signals as read therefrom.

19. The apparatus of claim 18 in which said counter means includes a counter (403) of predetermined capacity said counter means is clocked at a predetermined rate and said drum synchronized signal is of a second predetermined rate such that said counter means produces at least two outputs within successive occurrences of said drum synchronized signal.

20. The apparatus of claim 17 wherein said storage means comprises a microprocessor (100) and associated memory and a second latch (404a, 404b) and wherein said drum synchronized signal interrupts said microprocessor stimulating a memory access and wherein said second latch is coupled to said microprocessor to store therein a signal produced by said microprocessor in response to said interrupt, and means coupling said second latch to said latch, whereby said microprocessor accesses memory asynchronously with respect to other components of said servo motor means.

21. The apparatus of claim 17 wherein said clock includes phase locked loop means (411, 412, 413, 414) including a second counter (414) responsive to a drum velocity signal to clock said counter means, second counter means (417, 416, 415) responsive to signals from said second counter for producing said drum synchronized signals, said second counter means including synchronizing means (416) enabling counting of said second counter means to begin only at selected orientations of said drum.

22. The apparatus of claim 21 wherein said second counter means includes a third counter (417) responsive to clocking signals from said second counter, gate means (416) for enabling counting by said third counter, said gate means enabling said third counter when and only when said second counter is in a predetermined state and said drum has reached a selected orientation.

23. A translation system to produce a controlled and repeatable velocity profile, acceleration profile and position profile of a controlled object with respect to an independent parameter including a single control loop with driving means including a servo motor coupled to and driving said controlled object, feedback means responsive to driving means movement for producing a feedback pulse train, driving signal source means for producing a driving signal pulse train, pulse generating means for producing an independent pulse train representative of said independent parameter, control means connected to said feedback means, said driving signal source means and said pulse generating means to combine the feedback, driving signal and independent pulse trains for producing an output signal synchronized to said independent parameter, and coupling means coupling said control means to said driving means for driving said servo motor in accordance with said output signal to achieve a repeatable velocity profile, a repeatable acceleration profile and a repeatable position profile in said single control loop.

24. The translation system of claim 23 wherein said pulse generating means produces a frequency output representative of the velocity of independent apparatus to which said servo motor is controlled.

25. The translation system of claim 23 wherein said pulse generating means produces a frequency output representative of the acceleration of independent apparatus to which said servo motor is controlled.

26. The translation system of claim 23 wherein said coupling means includes means for forming an analog signal representation of the combination of said driving pulse train, said feedback pulse train and said independent pulse train.

27. The translation system of claim 23 wherein said control means is connected to said pulse generating means through said driving signal source means which includes drive signal alteration means by synchronizing said driving pulse train with said independent parameter.

28. The translation system of claim 27 wherein said control means includes means for determining the difference count between the driving pulse train and the feedback pulse train and produces said output signal representative of said difference count.

29. The translation system of claim 28 wherein said coupling means includes means for forming an analog signal representative of said output signal.

30. The translation system of claim 29 wherein said pulse generating means produces a frequency output representative of the velocity of independent apparatus to which said servo motor is controlled.

31. The translation system of claim 29 wherein said pulse generating means produces a frequency output representative of the acceleration of independent apparatus to which said servo motor is controlled.

32. The translation system of claim 29 wherein said controlled object is scanning apparatus for use in machinery means for the production of information bearing media.

33. The translation system of claim 32 wherein said machinery means is a document copier machine and said scanning apparatus is used in scanning a document to be copied.

34. The translation system of claim 33 wherein said machine is an electrostatic copying machine comprising:
   a motor,
   image carrier means driven by said motor for recording an image thereon,
   a transparent document support,
   said scanning apparatus for directing an image of said document to be copied from said document support to said image carrier, and
   said pulse generating means producing said independent pulse train to represent the velocity of said motor.

35. A translation system to produce a controlled and repeatable velocity profile, acceleration profile and position profile of a controlled object with respect to an independent parameter including a single control loop with driving means including a servo motor coupled to and driving said controlled object,
   feedback means responsive to driving means movement for producing a feedback pulse train,
   direction means for producing a direction signal representative of the direction of driving means movement,
   driving signal source means for producing a driving signal pulse train,
   pulse generating means for producing an independent pulse train representative of said independent parameter,
   control means connected to said feedback means, said driving signal source means, said pulse generating means and said direction means to combine the feedback, driving signal and independent pulse trains for producing an output signal synchronized to said independent parameter, said output signal also representing the direction of desired movement of said driving means, and
   coupling means coupling said control means to said driving means for driving said servo motor in accordance with said output signal to achieve a repeatable velocity profile, a repeatable acceleration profile and a repeatable position profile in said single feedback loop.

36. The translation system of claim 35 wherein said independent pulse train is divided into repeatable pulse sequences and said control means includes synchronizing means for altering the direction of said controlled object so that at a specific position of movement in a first direction the controlled object is decelerated, reversed in direction, accelerated in a second direction, decelerated, again reversed in direction and brought up to desired velocity in said first direction at a controlled and repeatable point in time and position relative to the pulse sequences of said independent pulse train.

37. The translation system of claim 36 wherein said pulse generating means produces a frequency output representative of the velocity of independent apparatus to which said servo motor is controlled.

38. The translation system of claim 36 wherein said pulse generating means produces a frequency output representative of the acceleration of independent apparatus to which said servo motor is controlled.

39. The translation system of claim 36 wherein said coupling means includes means for forming an analog signal representation of the combination of said driving pulse train, said feedback pulse train and said independent pulse train.

40. The translation system of claim 36 wherein said control means is connected to said pulse generating means through said driving signal source means which includes drive signal alteration means for synchronizing said driving pulse train with said independent parameter.

41. The translation system of claim 40 wherein said control means includes means for determining the difference count between the driving pulse train and the feedback pulse train and produces said output signal representative of said different count.

42. The translation system of claim 41 wherein said coupling means includes means for forming an analog signal representative of said output signal.

43. The translation system of claim 42 wherein said pulse generating means produces a frequency output representative of the velocity of independent apparatus to which said servo motor is controlled.

44. The translation system of claim 42 wherein said pulse generating means produces a frequency output representative of the acceleration of independent apparatus to which said servo motor is controlled.

45. The translation system of claim 42 wherein said controlled object is scanning apparatus for use in machinery means for the production of information bearing media.

46. The translation system of claim 45 wherein said machinery means is a document copier machine and said scanning apparatus is used in scanning a document to be copied.

47. The translation system of claim 46 wherein said machine is an electrostatic copying machine comprising:
   a motor,
   image carrier means driven by said motor for recording an image thereon,
   a transparent document support,
   said scanning apparatus for directing an image of said document to be copied from said document support to said image carrier, and
   said pulse generating means producing said independent pulse train to represent the velocity of said motor.

48. The translation system of claim 47 wherein one of said pulse sequences represents one complete operational cycle of said image carrier means and said scanning means is brought to said repeatable point in time and position at a particular pulse in said sequence repeatable from sequence to sequence.

* * * * *